(12) United States Patent
Reeder et al.

(10) Patent No.: US 10,902,380 B2
(45) Date of Patent: *Jan. 26, 2021

(54) METHODS AND APPARATUS FOR MONITORING AND CONTROL OF ELECTRONIC DEVICES

(71) Applicant: Spireon, Inc.

(72) Inventors: Paul I. Reeder, Greenville, TX (US); Benjamin L. Kiser, Mesa, AZ (US); Paul K. Peterson, Chandler, AZ (US); Michael B. Maledon, Paradise Valley, AZ (US)

(73) Assignee: Spireon, Inc., Irvine, CA (US)

( * ) Notice: Subject to any disclaimer, the term of this patent is extended or adjusted under 35 U.S.C. 154(b) by 243 days.

This patent is subject to a terminal disclaimer.

(21) Appl. No.: 16/113,365

(22) Filed: Aug. 27, 2018

(65) Prior Publication Data

US 2019/0005442 A1 Jan. 3, 2019

Related U.S. Application Data

(63) Continuation of application No. 14/692,598, filed on Apr. 21, 2015, now Pat. No. 10,089,598, which is a (Continued)

(51) Int. Cl.
*G06Q 10/08* (2012.01)
*H04Q 9/00* (2006.01)
(Continued)

(52) U.S. Cl.
CPC .......... *G06Q 10/087* (2013.01); *H04Q 9/00* (2013.01); *H04W 4/029* (2018.02);
(Continued)

(58) Field of Classification Search
None
See application file for complete search history.

(56) References Cited

U.S. PATENT DOCUMENTS 6,025,774 A 2/2000 Forbes
6,249,217 B1 6/2001 Forbes
(Continued)

FOREIGN PATENT DOCUMENTS

CA 2683208 A1 11/2008
CA 2837320 A1 11/2012
(Continued)

*Primary Examiner* — Allen C Chein
(74) *Attorney, Agent, or Firm* — Luedeka Neely Group, P.C.

(57) ABSTRACT

Various aspects of the present invention relate generally to telemetry methods and systems and more particularly, to telemetry network connectivity systems, devices and methods. In some embodiments, an inventory management system may be configured to provide machine-to-machine network connectivity. The inventory management system may be used in conjunction with a location device configured to transmit a vehicle identification number (VIN) and a device identifier of the location device. In some embodiments, the inventory management system may be configured to: (1) track whether the location device is located within a predetermined perimeter; (2) provide current inventory and ownership status associated the location device; and/or (3) place the location device in a sleep and/or passive state with periodic check-ins.

32 Claims, 15 Drawing Sheets

Related U.S. Application Data continuation-in-part of application No. 12/505,325, filed on Jul. 17, 2009, now Pat. No. 9,516,394.

(51) Int. Cl.
*H04W 4/70* (2018.01)
*H04W 4/029* (2018.01)

(52) U.S. Cl.
CPC ..... *H04Q 2209/30* (2013.01); *H04Q 2209/40* (2013.01); *H04Q 2209/823* (2013.01); *H04Q 2209/883* (2013.01); *H04W 4/70* (2018.02)

(56) References Cited

U.S. PATENT DOCUMENTS

| | | | |
|---|---|---|---|
| 7,102,510 B2 | 9/2006 | Boling et al. | |
| 7,215,282 B2 | 5/2007 | Boling et al. | |
| 7,366,551 B1 | 4/2008 | Hartley | |
| 7,546,151 B2 | 6/2009 | Hartley | |
| 7,675,423 B2 | 3/2010 | Boling et al. | |
| 7,818,098 B2 | 10/2010 | Koepf et al. | |
| 7,830,305 B2 | 11/2010 | Boling et al. | |
| 7,970,496 B2 | 6/2011 | Koepf et al. | |
| 8,018,332 B2 | 9/2011 | Boling et al. | |
| 8,368,561 B2 | 2/2013 | Welch et al. | |
| 8,452,673 B2* | 5/2013 | Boling | G06Q 10/087 705/28 |
| 8,462,021 B2 | 6/2013 | Welch et al. | |
| 8,510,200 B2 | 8/2013 | Pearlman et al. | |
| 8,760,274 B2 | 6/2014 | Boling et al. | |
| 8,933,802 B2 | 1/2015 | Baade | |
| 9,008,894 B2 | 4/2015 | Bishop et al. | |
| 9,060,213 B2 | 6/2015 | Jones | |
| 9,070,271 B2 | 6/2015 | Baade et al. | |
| 9,316,737 B2 | 4/2016 | Baade | |
| 9,332,404 B2 | 5/2016 | Boling et al. | |
| 9,516,394 B2 | 12/2016 | Carlo et al. | |
| 9,551,788 B2 | 1/2017 | Epler | |
| 9,779,379 B2 | 10/2017 | Hall et al. | |
| 9,779,449 B2 | 10/2017 | Meyer et al. | |
| 10,089,598 B2 | 10/2018 | Reeder et al. | |
| 10,169,822 B2 | 1/2019 | Jarvis et al. | |
| 10,223,744 B2 | 3/2019 | Brady et al. | |
| 10,232,823 B1 | 3/2019 | Bobay et al. | |
| 10,255,824 B2 | 4/2019 | Pearlman et al. | |
| 2005/0026627 A1 | 2/2005 | Boling et al. | |
| 2005/0215194 A1 | 9/2005 | Boling et al. | |
| 2006/0007038 A1 | 1/2006 | Boling et al. | |
| 2007/0152844 A1 | 7/2007 | Hartley et al. | |
| 2008/0147245 A1 | 6/2008 | Koepf et al. | |
| 2008/0186135 A1 | 8/2008 | Boling et al. | |
| 2008/0198018 A1 | 8/2008 | Hartley | |
| 2008/0287151 A1 | 11/2008 | Fjelstad et al. | |
| 2009/0043445 A1 | 2/2009 | Bishop et al. | |
| 2009/0098921 A1* | 4/2009 | Manning | G07F 17/34 463/17 |
| 2009/0224966 A1 | 9/2009 | Boling et al. | |
| 2010/0103042 A1 | 4/2010 | Bishop et al. | |
| 2010/0299020 A1 | 11/2010 | Koepf et al. | |
| 2011/0016514 A1 | 1/2011 | Carlo et al. | |
| 2011/0093159 A1 | 4/2011 | Boling et al. | |
| 2011/0241903 A1 | 10/2011 | Welch et al. | |
| 2012/0299721 A1 | 11/2012 | Jones | |
| 2012/0299755 A1 | 11/2012 | Jones | |
| 2013/0088371 A1 | 4/2013 | Welch et al. | |
| 2013/0127617 A1 | 5/2013 | Baade et al. | |
| 2013/0141249 A1 | 6/2013 | Pearlman et al. | |
| 2013/0144770 A1 | 6/2013 | Boling et al. | |
| 2013/0144771 A1 | 6/2013 | Boling et al. | |
| 2013/0144805 A1 | 6/2013 | Boling et al. | |
| 2013/0147617 A1 | 6/2013 | Boling et al. | |
| 2013/0159214 A1 | 6/2013 | Boling et al. | |
| 2013/0185193 A1 | 7/2013 | Boling et al. | |
| 2013/0302757 A1 | 11/2013 | Pearlman et al. | |
| 2014/0012634 A1 | 1/2014 | Pearlman et al. | |
| 2014/0052605 A1 | 2/2014 | Beerle et al. | |
| 2014/0074692 A1 | 3/2014 | Beerle et al. | |
| 2014/0095061 A1 | 4/2014 | Hyde | |
| 2014/0125500 A1 | 5/2014 | Baade | |
| 2014/0125501 A1 | 5/2014 | Baade | |
| 2014/0279293 A1* | 9/2014 | Morgan | G07C 5/0858 705/28 |
| 2014/0280658 A1 | 9/2014 | Boling et al. | |
| 2015/0006207 A1 | 1/2015 | Jarvis et al. | |
| 2015/0019270 A1 | 1/2015 | Jarvis et al. | |
| 2015/0024727 A1 | 1/2015 | Hale-Pletka et al. | |
| 2015/0066362 A1 | 3/2015 | Meyer et al. | |
| 2015/0067312 A1 | 3/2015 | Lewandowski et al. | |
| 2015/0095255 A1 | 4/2015 | Hall et al. | |
| 2015/0186991 A1 | 7/2015 | Meyer et al. | |
| 2015/0356497 A1 | 12/2015 | Reeder et al. | |
| 2016/0225072 A1 | 8/2016 | Brady et al. | |
| 2016/0282466 A1 | 9/2016 | Epler | |
| 2017/0262717 A1 | 9/2017 | Drazan et al. | |
| 2018/0300967 A1 | 10/2018 | Winograd | |
| 2018/0352198 A1 | 12/2018 | Raasch et al. | |
| 2019/0061692 A1 | 2/2019 | Bobay et al. | |

FOREIGN PATENT DOCUMENTS

| | | |
|---|---|---|
| CA | 2856796 A1 | 5/2013 |
| CA | 2867447 A1 | 9/2013 |
| CA | 2826902 A1 | 3/2014 |
| CA | 2828835 A1 | 4/2014 |
| CA | 2832185 A1 | 5/2014 |
| CA | 2846134 A1 | 9/2014 |
| MX | 2009011420 A | 3/2010 |
| MX | 2010001545 A | 8/2010 |
| WO | 2005086933 A2 | 9/2005 |
| WO | 2006028995 A2 | 3/2006 |
| WO | 2006028995 A3 | 2/2007 |
| WO | 2007146449 A2 | 12/2007 |
| WO | 2007146449 A3 | 10/2008 |
| WO | 2008121612 A1 | 10/2008 |
| WO | 2008144411 A1 | 11/2008 |
| WO | 2005086933 A3 | 12/2008 |
| WO | 2009021117 A1 | 2/2009 |
| WO | 2010047887 A3 | 6/2010 |
| WO | 2012162358 A1 | 11/2012 |
| WO | 2012162450 A1 | 11/2012 |
| WO | 2013078291 A1 | 5/2013 |
| WO | 2013138798 A1 | 9/2013 |

* cited by examiner

| Dashboard | Reports | Manage Devices | Purchase | Sell | Install | Account |

Advanced Search [ ]    View Report

Active Devices: Honda
Active: 408

Airtime Remaining Key

▧ Airtime plan expired
▦ Airtime plan will expire in 30 days or less
☐ Airtime plan has more than 30 days remaining

| Lot Name | VIN | Inventory Status | Stock Number | Lot Status | Serial Number | Installation Date |
|---|---|---|---|---|---|---|
| | 1234AABB | Retail | | On lot | xyz1234 | 8/28/2014 |
| | 1234CCDD | Retail | | Off lot | xyz1235 | 8/18/2014 |
| | 1234EEFF | Retail | | On lot | xyz1236 | 8/13/2014 |
| | 1234GGHH | Retail | | Off lot | xyz1237 | 7/11/2014 |
| | 1234IIJJ | Retail | | On lot | xyz1238 | 8/4/2014 |
| | 1234KKLL | Retail | | On lot | xyz1239 | 6/3/2014 |
| | 1234MMNN | Retail | | On lot | xyz1210 | 7/11/2014 |
| | 1234OOPP | Retail | | On lot | xyz1211 | 6/25/2014 |
| | 1234QQRR | Retail | | On lot | xyz1212 | 6/25/2014 |
| | 1234SSTT | Retail | | Off lot | xyz1213 | 7/7/2014 |

1110

METHODS AND APPARATUS FOR MONITORING AND CONTROL OF ELECTRONIC DEVICES

CROSS-REFERENCE TO RELATED APPLICATIONS

This application a continuation of U.S. patent application Ser. No. 14/692,598, filed Apr. 21, 2015, titled "Methods and Apparatus for Monitoring and Control of Electronic Devices," which is a continuation-in-part of U.S. patent application Ser. No. 12/505,325, filed on Jul. 17, 2009, and incorporates the disclosure of such application by reference.

FIELD

This invention relates to the field of telemetry methods and systems. More particularly, this invention relates to telemetry network connectivity systems, devices and methods.

BACKGROUND

Telemetry typically refers to wireless communications, such as a radio system, telephonic, computer network, optical link or by wire. Telemetry (often synonymous with telematics) is a technology that allows the remote measurement and reporting of information of interest to the system designer or operator. Systems that use instructions and data sent to them to operate use telecommand, the counterpart of telemetry. Telematics systems typically combine telecommunications and information processing, and frequently utilize remote devices.

M2M refers to data communications between machines. M2M is most commonly translated as Machine-to-Machine but has sometimes been translated as Man-to-Machine, Machine-to-Man, Machine-to-Mobile and Mobile-to-Machine. Like all evolving technologies, its definition continues to evolve, but it generally refers to telemetry or telematics that is accomplished using data networks including, but not limited to, public wireless data networks. M2M can also mean the family of sensors, middleware, software and applications that help improve efficiency and quality by tying together a myriad of sensors with mission critical applications like asset management, enterprise resource planning (ERP), and customer resource management (CRM).

In the past, telemetry systems were the exclusive domain of very large well-financed organizations. NASA used telemetry extensively from the very beginning of the space program, which was probably one of the first applications. Large oil and gas companies and electric utilities, through the use of extensive customer-built and dedicated data networks, were among the first private organizations to use telemetry.

In recent years, the cost of access to public wireless data networks (CDMA, GPRS, Mobitex, etc.) is decreasing while the capability of these networks continues to increase. M2M generally includes technology that leverages these networks to bring telemetry to a much wider audience. In addition, M2M sometimes refers to similar leveraging of the Internet leading to the pervasive Internet. The pervasive Internet refers to the deployment of web services on devices, smart metering, and new streaming sensor technologies that creates "data torrents and rivers" of such volumes that traditional data warehouses and analytic tools struggle to keep up and manage the information, let alone provide close to real-time analytics, processing, and controls based on that information.

As the scope of M2M has evolved, other terms like Machine to Human (M2H) and Machine to Enterprise (M2E) are starting to emerge to segment the pervasive nature of the M2M term. The M2M device, software, network, and service market is expected to grow rapidly worldwide in the near future. There are on the order of a half billion computers in the world and over one and a half billion cell phones and PDAs, and it is estimated that there are more than 38 billion other electronic devices that have information relevant to improving an enterprise operations. For instance, vehicle containers, tankers, supply chain assets, items with SKU's, medical devices, HVAC, industrial machinery, distributed generation, industrial controllers, appliance controllers, vending machines, vehicle locators, and the like are all candidates for telemetry applications. The M2M market strives to connect these devices to corporations, governments, institutions, and individuals.

Dealing with different devices and networks can be a burden to developers, since each device may have a different communication protocol, and different networks have different interface requirements. Initially, if a developer was versed in the inner workings of the device operating system, a custom device driver was written for controlling the device operation, but this was time consuming and required intimate knowledge of device operation. The industry moved from custom designs to an application programming interface (API). An API is a set of routines, data structures, object classes and/or protocols provided by libraries and/or operating system services to support the building of applications. An API may be language-dependent; that is, available only in a particular programming language, using the particular syntax and elements of the programming language to make the API convenient to use in its particular context. Alternatively, an API may be language-independent; that is, written in a way that means it can be called from several programming languages (typically an assembly/C-level interface). This allows a service-style API that is not bound to a particular process or system and is available as a remote procedure call.

The API itself is largely abstract in that it specifies an interface and controls the behavior of the objects specified in that interface. The software that provides the functionality described by an API is said to be an implementation of the API. An API is typically defined in terms of the programming language used to build an application. The related term, ABI (Application Binary Interface), is a tower level definition concerning details at the assembly language level. For instance, the POSIX standard defines an API that allows a wide range of common computing functions to be written such that they may operate on many different systems; however, making use of this requires re-compilation for each platform. A compatible ABI, on the other hand, allows compiled object code to function without any changes, on any system implementing that ABI. This is advantageous to both software providers (where they may distribute existing software on new systems without producing/distributing upgrades) and users (where they may install older software on their new systems without purchasing upgrades), although this generally requires various distributed software libraries implementing the necessary APIs. Library versioning, device addressing and message handling across varied networks encumber software designers and end users.

An advantageous process over API solutions is utilizing OLE for Process Control (OPC). The OPC specification was based on the OLE, COM, and DCOM technologies developed by Microsoft for the Microsoft Windows operating system family. This specification defined a standard set of objects, interfaces and methods for use in process control and manufacturing automation applications to facilitate interoperability. OPC was designed to bridge Windows-based applications and process control hardware and software applications. The standard defines a consistent method of accessing field data from distributed devices. This method remains the same regardless of the type and source of data. OPC servers provide a method for many different software packages to access data from a process control device, such as a PLC or DCS. Traditionally, any time a package needed access to data from a device, a custom interface, or driver, had to be written. The purpose of OPC is to define a common interface that is written once and then reused by any business, SCADA, HMI, or custom software packages. Once an OPC server is written for a particular device, it can be reused by any application that is able to act as an OPC client. OPC servers use Microsoft's OLE technology (also known as the Component Object Model, or COM) to communicate with clients. COM technology permits a standard for real-time information exchange between software applications and process hardware. However, lack of security, lack of scalability, frequent configuration issues with DCOM, lack of configurable timeouts, and its restriction to the Windows Operating System were significant drawbacks to OLE for process control.

SUMMARY

Various aspects of the present invention relate generally to telemetry methods and systems and more particularly, to telemetry network connectivity systems, devices and methods. In accordance with various embodiments, an inventory management system configured to provide machine-to-machine network connectivity includes a configurable device translation server module, a configurable complex message constructor and at least one database. In some embodiments the inventory management system, specifically the complex message constructor, may be configured to authenticate commands between an interface and the device translation server. Additionally, the inventory management system, specifically the complex message constructor, may be configured to manage messages between the interface and the device translation server. Managing messages may include initiating alerts and notifications based on a comparison of programming and substantially synchronous and stored information.

In accordance with various embodiments, the inventory management system configured to provide machine-to-machine network connectivity includes a configurable interface, a configurable device translation server module, a device capable of telemetry-based communication, a configurable complex message constructor, and at least one database. In some embodiments, the inventory management system, specifically the complex message constructor, may be configured to authenticate commands between an interface and the device translation server. Additionally, the inventory management system, specifically the complex message constructor, may be configured to manage messages between the interface and the device translation server. Managing messages may include initiating alerts and notifications based on a comparison of programming and substantially synchronous and stored information. According to various embodiments, the inventory management system may also include a global network.

In accordance with various embodiments, a method of machine-to-machine communication may include (1) authenticating an issued command, (2) discovering a device, (3) reviewing command content and compare with preset programming, (4) querying, storing and retrieving information from a database, (5) translating of device specific protocol to uniform protocol, (6) executing a method synchronously if desired (7) executing a method in simulated synchronously if synchronicity is unavailable, (8) translating to specific protocol to uniform protocol, and/or (9) sending reply to issued command. Information can be sent in either direction, such as from the user to a device or from a device to a user. Also, users and/or devices may retrieve information from a database.

Additionally, in some embodiments, an inventory management system configured to provide machine-to-machine network connectivity might be further configured to allow a user to set a notification preference and/or an escalating notification preference. In some embodiments, the database may be coupled to the configurable device translation server virtually. Also, in some embodiments, the database may be coupled to the complex message constructor virtually. In some embodiments, an inventory management system configured to provide machine-to-machine network connectivity may comprise an optimization utility configured to provide machine-to-machine network communication based on network optimization factors.

In some embodiments, an inventory management system configured to provide machine-to-machine network connectivity may be used in conjunction with a location device configured to transmit a vehicle identification number (VIN) and an identifier of the location device, wherein the inventory management system may be configured to associate the VIN and the location device identifier. In some embodiments, an inventory management system configured to provide machine-to-machine network connectivity and/or a location device may be configured to track whether the location device is located inside or outside of a predetermined perimeter.

In some embodiments, an inventory management system configured to provide machine-to-machine network connectivity may be configured to accept from a requestor a plurality of digits of a vehicle VIN and return the location of the vehicle, having a location device, to the requestor. In some embodiments, an inventory management system configured to provide machine-to-machine network connectivity may comprise software instructions stored in a location device, wherein the software instructions are configured to place the location device in a sleep and/or passive state with periodic check-ins.

In accordance with various embodiments, a method and system of machine-to-machine communication includes multiple unique devices utilizing device specific protocols, device specific networks, and device specific applications. One or more of the unique devices may comprise a location device for a vehicle, for example a GPS tracking unit, which may be configured to be selectably connectable to a vehicle interface such as an on-board diagnostic interface (e.g. OBD-II). The device specific protocols may include one or more of XML, SOAP over HTTP, WSDL, UDDI, SMTP, binary encoding over TCP, ReFlex, GPRS, EDGE, Mobitex, CDMA, EVDO, VSAT, wired LAN, Wired WAN, message queues via Microsoft Windows MSMQ, and the like and/or any combination thereof, but these are examples only and are not limiting of device specific protocol options. In accordance with various embodiments, the device specific networks may include one or more of Skytel, USAM, Wyless, Sprint, Private LAN, T-Mobile, AT&T, Private VPN, and Private WAN, and any combinations thereof, in addition to any other desired networks. Additionally, in some embodiments, the inventory management system configured to provide machine-to-machine network connectivity may be passive, initiated by a user, initiated by a device, or be initiated by a preprogrammed condition. In some embodiments, the inventory management system configured to provide machine-to-machine network connectivity may be substantially synchronous, asynchronous, or synchronous.

Other features and advantages of the present technology should become apparent from the following description of exemplary embodiments, taken in conjunction with the accompanying drawings, which illustrate, by way of example, various aspects of the technology.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

FIG. 11 representatively illustrates a second view of a user interface according to an exemplary embodiment of the present technology;

DETAILED DESCRIPTION

Figure 1:
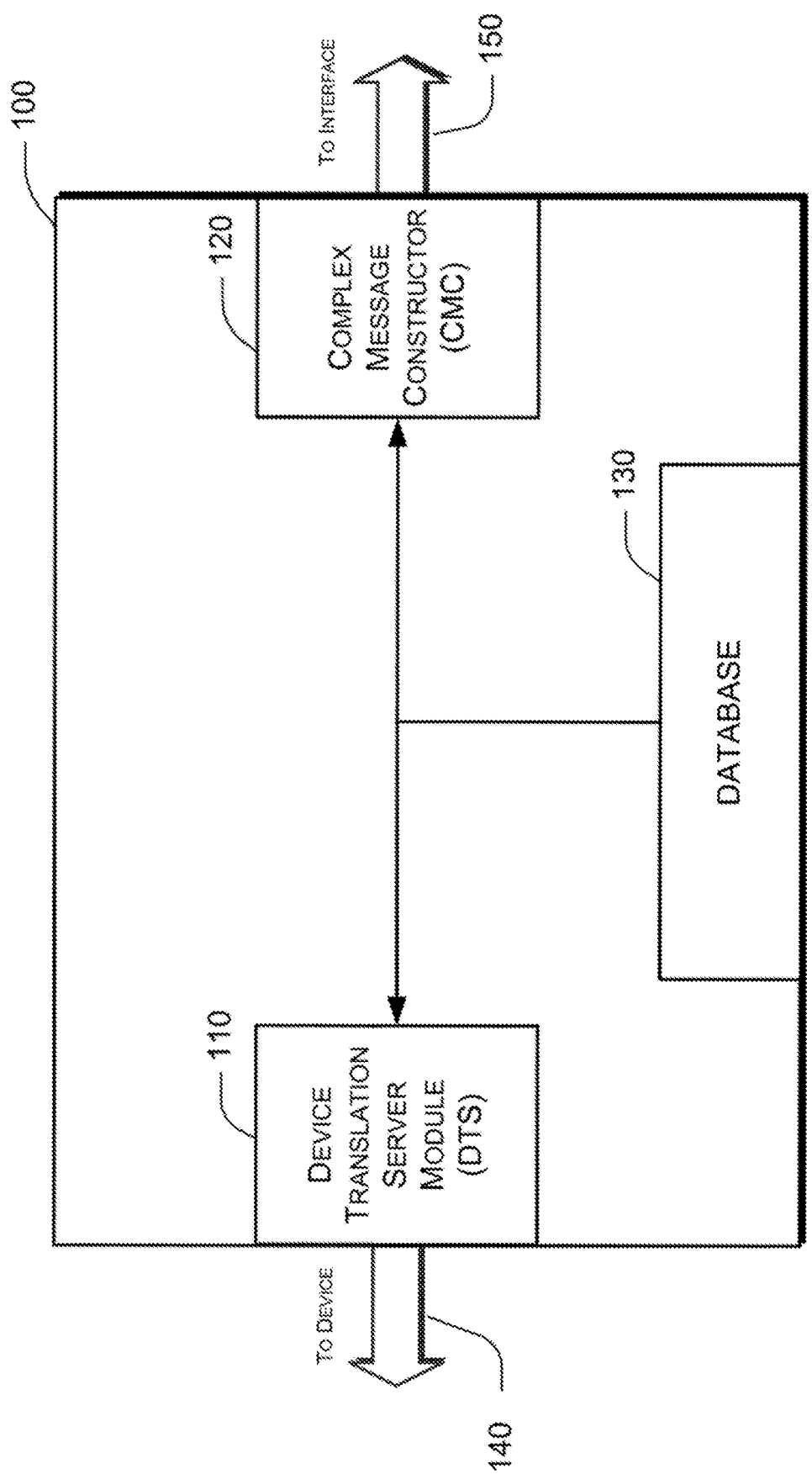
FIG. 1 illustrates an embodiment of an inventory management system configured to provide machine-to-machine network connectivity architecture in accordance with the systems and methods described herein.

In the following paragraphs, various aspects of the present invention will be described in detail by way of example with reference to the attached drawings. Throughout this description, the exemplary embodiments and examples shown should be considered as exemplars, not as limitations on the technology. Any reference to various feature(s) of the "present invention" throughout this document does not mean that all claimed embodiments or methods must include the referenced feature(s).

The present technology may be embodied as a method, a system, a device, and/or a computer program product. Accordingly, the present technology may take the form of an entirely software embodiment, an entirely hardware embodiment, or an embodiment combining aspects of both software and hardware. Furthermore, the present technology may take the form of a set of instructions, such as a computer program product, for causing a processor and/or computing device to perform a desired function, stored on a computer-readable storage medium having computer-readable program code embodied in the storage medium. Any suitable computer-readable storage medium may be utilized, including, but not limited to, hard disk drive, CD-ROM, optical storage devices, magnetic storage devices, USB memory devices, any appropriate volatile or non-volatile memory system, and the like or any combination thereof. The present technology may take the form of a downloadable and/or cloud-based non-downloadable computer program product and/or methods.

Various aspects of the present invention may operate in conjunction with telemetry methods and systems, and various implementations may be described in conjunction with telemetry network connectivity systems, devices, and methods. In one embodiment, an inventory management system built on Microsoft's .NET Framework provides telemetry network connectivity irrespective of device type, device specific protocol, device specific network, or device location. In one embodiment, the inventory management system is configured to connect a plurality of devices running on different networks with different data protocols and provide a common interface for communication and/or web development, to, among other things, insulate the web developer from the need to develop and maintain connections to different wireless networks, and from having to handle multiple data formats. In another embodiment, the inventory management system is configured to connect a plurality of devices running on the same network with the same protocols and provide a common interface for communication and/or web development. Additionally, the inventory management system can be configured to provide a common interface for communication between combinations of the same or different networks, protocols, and devices. Devices can comprise mobile information appliances, static information appliances, mobile devices, static devices, and those containing controllers, smart sensors, microprocessors, microcontrollers, and/or the like.

Figure 14:
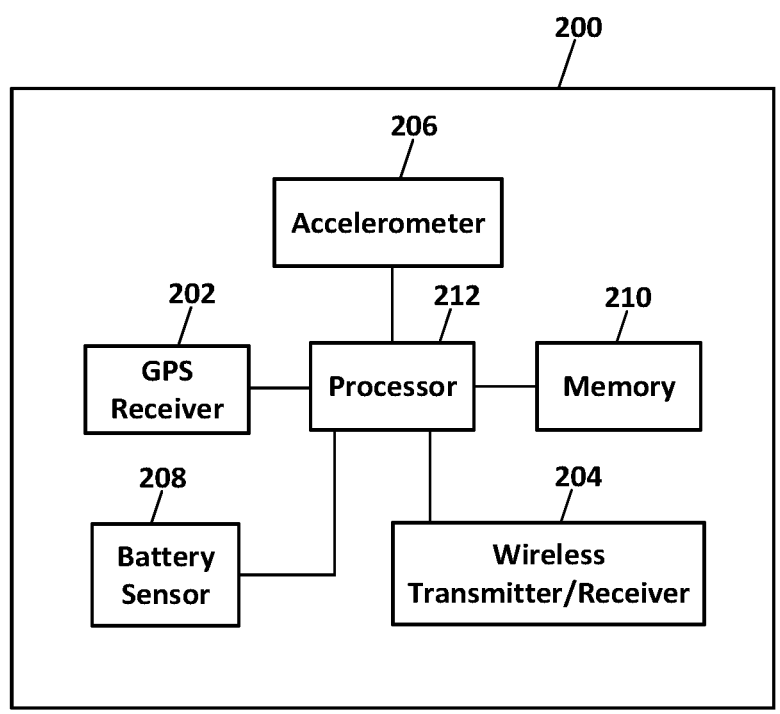
FIG. 14 depicts a location device according to an exemplary embodiment.

In one embodiment depicted in FIG. 14, the device may comprise a location device 200. The location device 200 may comprise any suitable system for determining a physical location of the location device 200 and communicating the position to the inventory management system. For example, the location device 200 may comprise a GPS receiver 202, Wi-Fi positioning system, space-based augmentation system (SBAS) such as WAAS/EGNOS/MSAS/GAGAN, and/or the like to facilitate determining the physical location of the location device. The determined physical location may be an approximate physical location, possibly depending on the system used to determine the physical location.

In one embodiment, the physical location of the location device may be determined by receiving information from another system configured to determine a physical location. For example, the location device may be communicatively coupled, such as selectably or permanently, to the vehicle interface (e.g., OBD-II) of a vehicle having a GPS receiver, and the location device may be configured to determine the physical location of the location device by receiving GPS information or other physical location information from the vehicle. In this exemplary embodiment, the vehicle location may approximate the physical location of the location device.

As depicted in FIG. 14, the location device 200 may comprise one or more transmitters and/or receivers 204. The location device 200 may comprise any suitable transmitter 204 for transmitting information, and may be configured to determine the information to be transmitted. In an exemplary embodiment, the location device may comprise a radio antenna for transmitting information across a radio network, such as a cellular network and/or a Bluetooth network. Information may be transmitted across a cellular network as messages using SMS, UDP, and/or the like. Information transmitted by the location device may comprise the physical location of the location device, measurements, observations, sensed information, collected information, status information, warnings, notifications, and/or the like. In an exemplary embodiment, the location device may be communicatively coupled to a vehicle and may transmit the physical location of the device, relative location information such as whether inside or outside a geo-fence, information about vehicle speed, cornering, braking, and/or acceleration, information corresponding to an impact, information about airbag status, and the like.

The location device may receive and process information. In an exemplary embodiment, the location device may comprise an antenna for receiving information across a radio network or link, such as a cellular network and/or a Bluetooth link. The received information may comprise commands, parameters, programming, configuration, maintenance, rules, and/or the like, for the location device. In some embodiments, the received information may affect the operation of the location device, for example by changing rules indicating when certain information should be transmitted, by causing the location device to operate in a sleep state, by activating or deactivating the location device, and so on.

The location device 200 may be configured to communicatively couple with a vehicle, such as via the vehicle's on-board diagnostic interface (e.g. OBD-II). In addition, the location device may comprise one or more sensors. In an embodiment as depicted in FIG. 14, the location device may comprise an accelerometer 206, for example measuring acceleration in three dimensions at a 1000 Hz sampling rate. The location device may be configured to detect or otherwise determine if a vehicle impact has occurred, such as by detecting deployment of airbags and/or excessive acceleration or deceleration. Further, the location device 200 may be configured to determine a state, voltage, and/or current of the vehicle battery measured by a sensor 208, to determine if the location device is disconnected, and/or may comprise a back-up battery in case an external source of power is or will soon be insufficient. The location device may comprise a memory and may be configured to store sensed, received, or otherwise determined data. The sensed, received, or otherwise determined data may be transmitted as described above, for example to another party or system desiring or configured to obtain information about the vehicle.

The location device may be programmable to monitor specified external conditions, capture defined threshold events such as excessive engine speed, rapid acceleration, hard braking, speed violations, excessive idling, battery voltage, current, and/or state, and the like. The location device may be configured to react to pre-defined conditions related to location, whether actual (e.g. latitude and longitude) or relative (e.g. geofence), time, date, motion, ignition, physical location, trip reporting, and/or the like. The location device may be configured to be programmed before shipping to a customer, at a customer facility, and/or over-the-air once the location device has been installed, for example in a vehicle. In an exemplary embodiment, the location device may be compatible with the Novatel Wireless® N4A™ Communications and Management Software and/or N4A™ Device Manager.

In accordance with the above, the location device 200 may include a memory 210 and a processor 212 configured to be controlled by one or more instructions in the memory 210. The location device 200 may be configured such that the processor 212 can receive information from the one or more sensors 206 and 208, from an antenna, and/or the like. The location device 200 may be configured such that the processor 212 can cause information to be transmitted by an antenna, a USB port, and/or the like. The location device 200 may be configured to be always on and determining location information. In an exemplary embodiment, a location device 200 may be an off-the-shelf tracking device for a vehicle, for example for use by an end user, for user-based insurance, for fleet management, for managing driver behavior, and/or the like.

Referring to FIG. 1, in accordance with various embodiments, the inventory management system 100 may be configured to provide machine-to-machine network connectivity, and may include a configurable device translation server (DTS) module 110, a configurable complex message constructor (CMC) 120, and at least one database 130. As mentioned in more detail below, the device translation server module 110 may be coupled 140 to one or more electronic devices and the complex message constructor 120 may couple 150 to one or more interfaces. Such couplings may be implemented through any appropriate means, whether direct or indirect, virtual, digital, wireless, electronic, networked, or physical.

Figure 2:
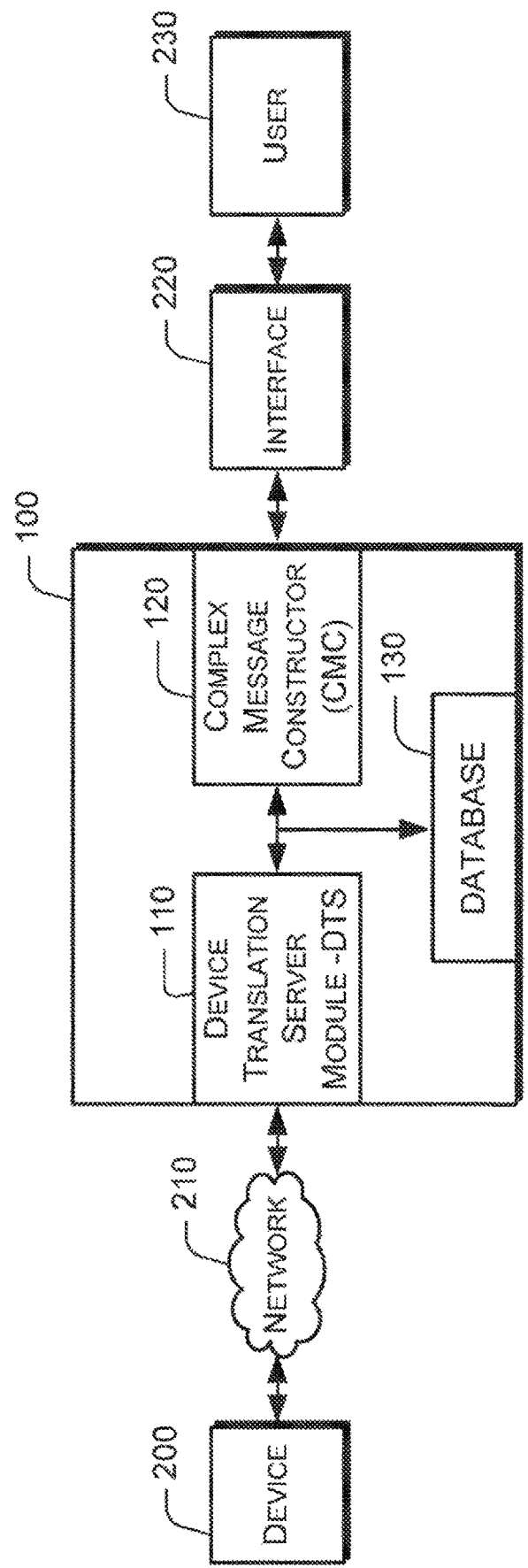
FIG. 2 illustrates another embodiment of an inventory management system configured to provide machine-to-machine network connectivity.

In one embodiment, referring to FIG. 2, each device 200 is coupled to its own DTS 110, and in the embodiment shown, the coupling is accomplished through a network 210. In an interface-initiated scenario, the DTS 110 connects to the network 210 to communicate with the device, and translates from a common interface 220 used by an application such as a World Wide Web- or Internet-based application into the specific protocol needed by the device 200. The interface 220 may represent any desired data input/output mechanism, including but not limited to a web application interface, a dedicated software application interface, a personal digital assistant (PDA) interface, a mobile communication device interface, an interactive voice response system, a DTMF-tone control system, and combinations thereof.

Figure 3:
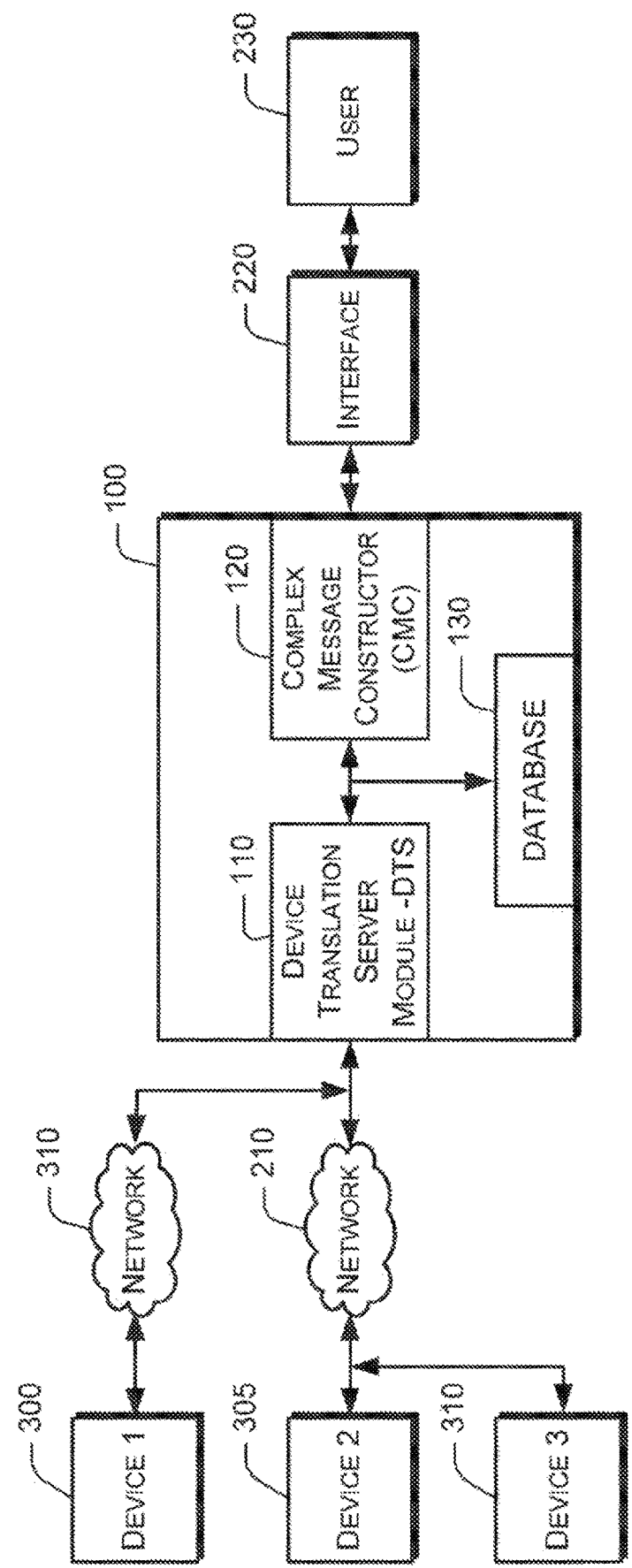
FIG. 3 illustrates an embodiment of an inventory management system configured to provide multiple dissimilar devices machine-to-machine network connectivity over multiple networks.

In some embodiments, referring to FIG. 3, the configurable device translation server module 110 is configured to run a device instance method and store the device instance method in the database 130 wherein the device instance method includes device specific protocol information, device type and device specific network information. In this manner, a single instance of a DTS 110 may be invoked, or multiple instances of a DTS 110 may be instantiated and available in the database 130. Devices 2 and 3 as shown (305, 310, respectively) may communicate on the same network 210 to the one or more DTS instances, and different or similar other devices 300 may communicate with a DTS 110 through a disparate network connection 310. For instance, one DTS instance could serve a single type of tracking device on an AT&T network, and a separate DTS instance could serve that same type of device on the T-Mobile network. Alternatively, a single DTS instance could communicate with both AT&T and T-Mobile for the given device type.

Each device communicates with its DTS instance using the device's protocol and/or its DTS's 110 own proprietary protocol, and the DTS instance translates incoming and outgoing messages into a common protocol (common telemetry interface or CTI) to communicate with the remainder of the system. One device (e.g. 300, 305, or 310) may report speed in kilometers per hour, while another type of device reports speed in knots, and another type of device reports speed in miles per hour. Each of these messages would be translated into CTI by their associated DTS instance, and the resulting speed alert transmitted to the client application would be represented in a common format that expresses speed in miles per hour. In another example, one GPS tracking device may report location in a text message using the NMEA protocol, while another may send in a binary message. When these messages are communicated through their respective DTS instances/modules, they are translated into a common format that expressed latitude and longitude in decimal degrees, and altitude in meters. The DTS 110 and CMC 120 may be the located in same or different modules or suites.

Figure 4:
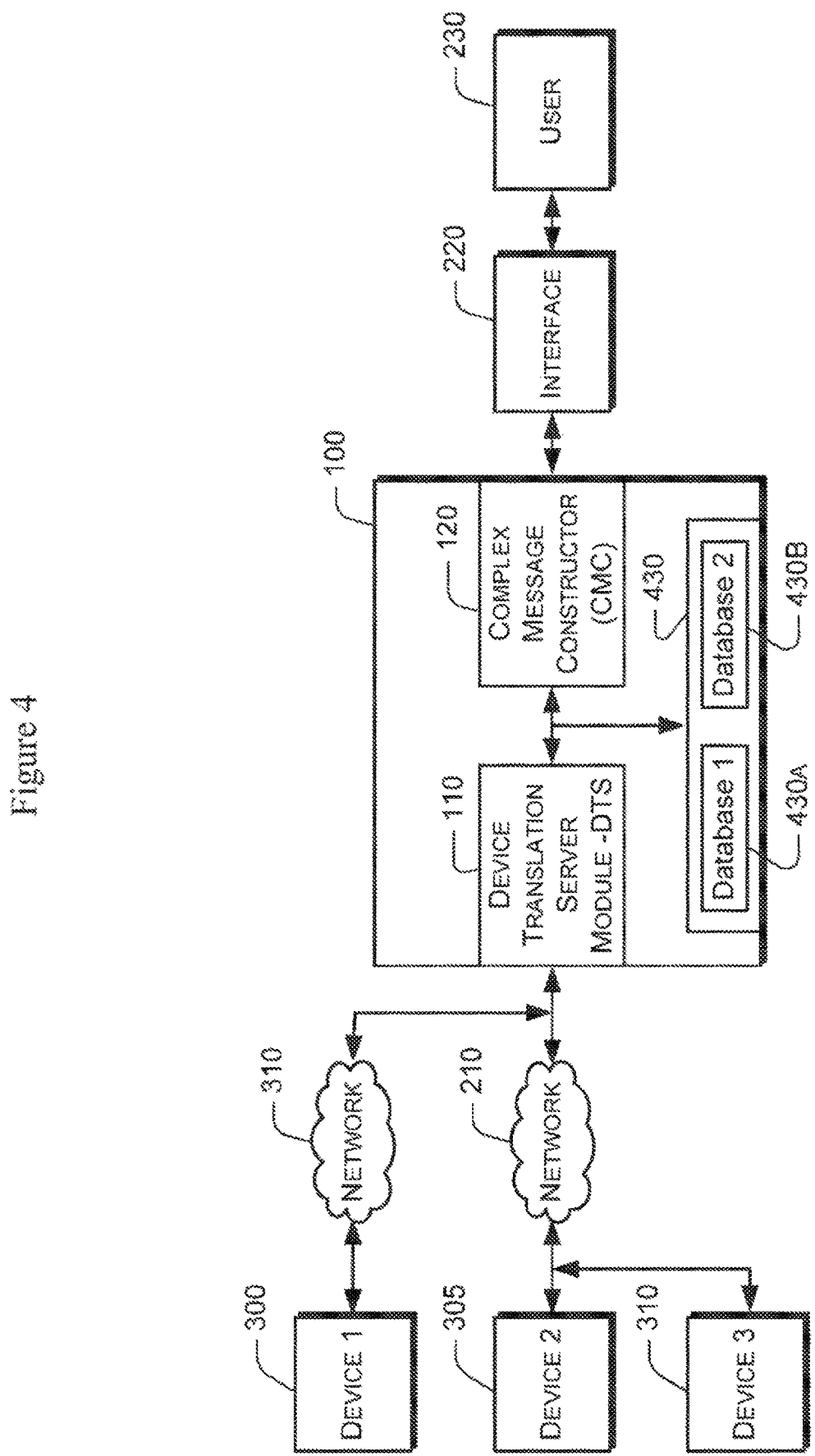
FIG. 4 illustrates an embodiment of an inventory management system configured to provide machine-to-machine network connectivity comprising multiple databases.
Figure 5:
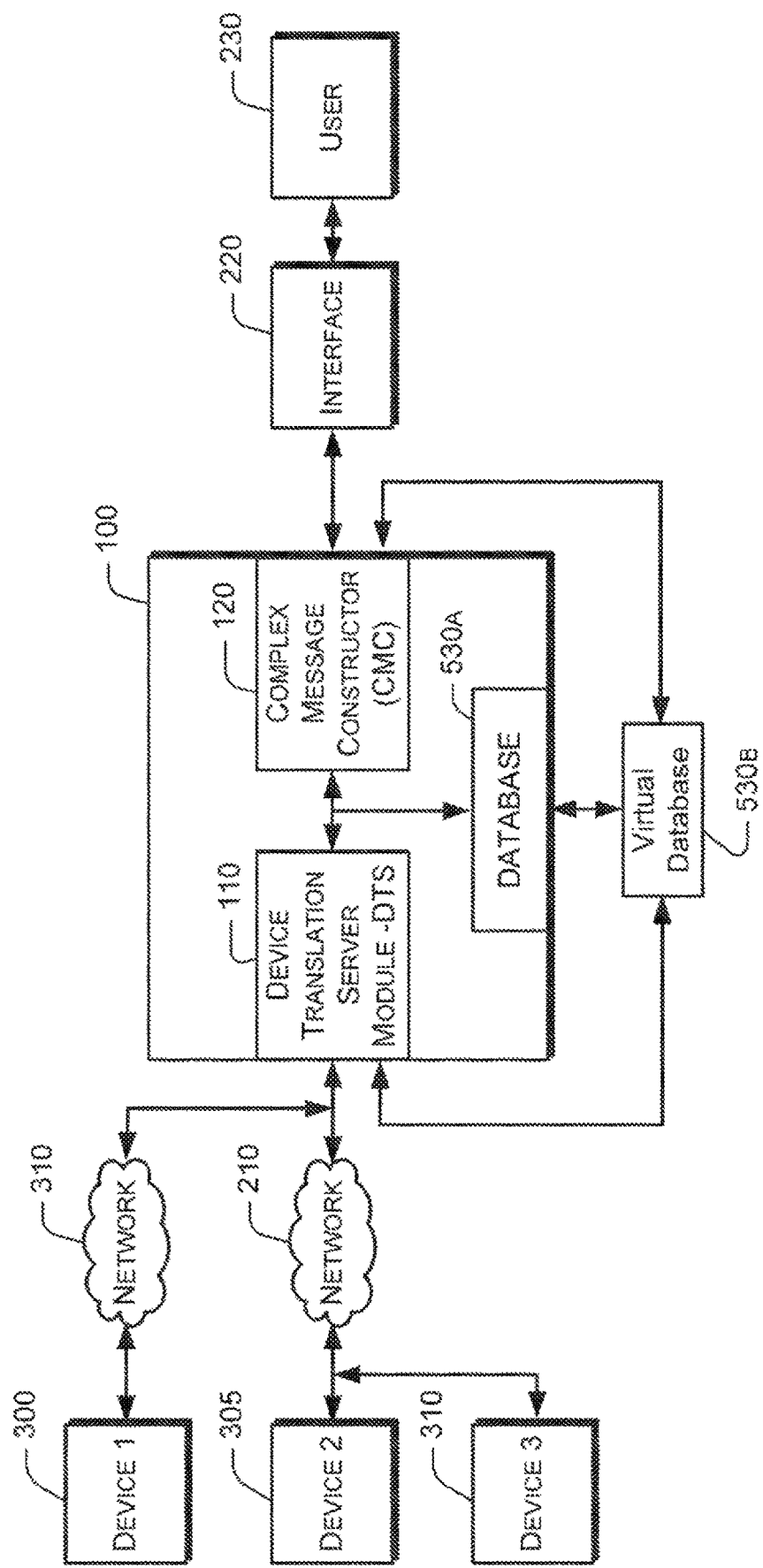
FIG. 5 illustrates another embodiment of an inventory management system configured to provide multiple similar and dissimilar devices machine-to-machine network connectivity over multiple networks comprising a local and at least one virtual database.

The inventory management system 100 system data facility comprises at least one database 130 that tracks device configuration, user credentials and/or messaging activity. As shown in FIGS. 4 and 5, the system data facility may comprise multiple databases 430A, 430B, 530A, 530B (and others not shown) either virtual or physical, collocated with the system data facility (e.g. in database repository 430) or remotely located. Any suitable server may be used, and in one embodiment, the system data facility may be built on Microsoft SQL Server. This provides a robust, industry-standard platform for retention of mission-critical data. In one embodiment, the system data facility may provide and store user credentials, provide and store device configuration, provide and store device specific protocol information, provide and store device specific network information, and/or provide and store device measurement and reporting information.

In some embodiments, the inventory management system 100, such as the CMC 120, may be configured to authenticate commands between a user interface and the device translation server. The user interface may comprise any suitable system or device such as a web application interface. This user interface may assist users in interacting with the inventory management system 100 configured to provide machine-to-machine connectivity, retrieve data, and/or control a particular machine, device, computer program, or other complex tool. The interface 220 may comprise the user interface and an input device, allowing the users to manipulate the inventory management system 100, and an output, allowing the system to indicate the effects of the users' manipulation. For example, the interface 220 may comprise a graphical user interface (GUI), web-based user interface and/or web user interface, command line interface, tactile interface, touch interface attentive user interface, batch interface, conversational interface agent, crossing-based interface, device control panel interface, gesture interface, intelligent user interface, multi-screen interface, noncommand user interface, object-oriented user interface (OOUI), reflexive user interface, tangible user interface, text user interface, voice user interface, natural-language interface, zero-input interface, and/or zooming user interface.

The CMC 120 contains modules to process authentication and security, manage databases, and provide alerts and notifications based on device pre-sets or default values. In one embodiment, client web applications may connect to an inventory management system 100 through the CMC 120. Each web application can use a device discovery function to determine which devices are available and what features those devices support. The device discovery function allocates which devices are available to be queried. Device functionality and access may be different according to various permissions set for unique users of an interface, such as a web interface. For instance, a selection of users or a single user may be able to view device historical use or device current status but not control a device based on preset CMC conditions and/or settings. In one embodiment, the complex message constructor may provide one or more of credential verification, certificate matching, authentication, and/or discovery functions. The CMC 120 may encapsulate data, wrap private data in classes in object-oriented programming languages, provide protocol layering, and provide message encryption.

In some embodiments, an inventory management system 100 configured to provide machine-to-machine network connectivity may comprise an optimization utility configured to provide machine-to-machine network communication based on network optimization factors. In some embodiments the network optimization factors further comprise at least one of a determination of network availability, a determination of backup network availability, a determination of expected network data transfer duration, a determination of network data transfer rate, and a determination of expected backup network data transfer duration. For instance, the CMC 120 may review the requested instance of a method and select, based upon preprogrammed instructions and substantially current and historical data, which network to utilize from a plurality of networks for a device connected to a plurality of networks. These preprogrammed instructions and/or historical and/or current data may include which networks are presently available, have historically been available, which network is most economical, or which network comprises the optimal historical or present data transfer rate.

In some embodiments, the inventory management system 100, specifically the CMC 120, may be configured to manage messages between the interface and the device translation server. Managing messages may include initiating alerts and notifications based on a comparison of programming and substantially real time information and stored information. For instance, if desired, a database, such as the system data facility, may store historical device information. In some embodiments the inventory management system 100 data is reported synchronously, substantially simulated synchronously and/or substantially asynchronously. Substantially synchronous communication may comprise each end of an exchange of communication responding in turn without initiating a new communication. A typical activity that might use a synchronous protocol would be a transmission of files from one point to another. As each transmission is received, a response is returned indicating success or the need to resend. Each successive transmission of data generally requires a response to the previous transmission before a new one is initiated.

Simulated synchronicity comprises a selection of responses may be returned when a transmission is received. For instance, in a simulated synchronicity environment, if substantially real time data is requested and substantially real time data is currently unavailable, substitute historical data may be returned to the request instead of the unavailable substantially real-time data. For instance, if a user of a web application interface requested information relating the inventory in a specific remotely located vending machine but a communication had not recently been received or was currently unavailable from the vending machine, the most recent inventory information would be returned to a user rather than waiting for a substantially synchronous response from the vending machine. Asynchronous operation may comprise a process operating independently of other processes.

In another embodiment, the CMC 120 may intercept and re-route called methods based on a review of message content and a comparison of preprogrammed data. Alternatively, the CMC 120 may review message content and issue a notification based on a comparison of programming and stored device measurement and reporting information and/or substantially real-time device measurement and reporting information. These notifications may comprise at least one of notifying a user and/or web application of a condition and issuing a preprogrammed command to the device. The programming may comprise at least one of a determination of data trends, the device status, the device location, a device located in an allowed and/or disallowed location, receiving a VIN and/or device identifier, ignition status, a speed threshold exceeded, a battery voltage and/or current threshold exceeded, device communication failure, the device operating in an unauthorized manner, a reported level deviating from an expected range, reported data exceeding a safety condition, and the like. For instance, the CMC 120 may review information sent from a thermostat which sends data that the temperature is exceeding a pre-set threshold. The CMC 120 may send a notification to a first user, and/or send a control signal to the HVAC system and/or device to increase and/or begin cooling the affected area.

Also, the programming may include preset escalation conditions. For instance, if the measured temperature over time continues to exceed the expected range and a comparison of the current value to previous historical values indicates an increasing temperature trend, additional HVAC system and/or devices may be directed to increase or begin cooling the affected area. A corresponding signal may be communicated to a first user. An additional warning may be communicated to a second user via the same or a different communication method such as a text or SMS message regarding the warning condition and/or device status.

In an exemplary embodiment, the CMC 120 may be configured to review location information received from a location device, for example a location device coupled to a vehicle. The inventory management system 100 my be configured with one or more zones associated with the location device. The one or more zones may be stored in the database 130, for example in an associated DTS instance. A zone may represent an area the location device should or should not be in, may be used to define a location status of the location device (e.g. in or out of the zone), and/or the like. A zone may be referred to as a geo-fence. A zone may be defined in any suitable manner, such as a circle centered on a specified location and having a specified radius or diameter, a polygon having vertices with specified coordinates, a city block, a border of a city, and the like, and may have positive, negative, neutral, or no attributes (such as allowed, non-allowed, in or out, and so on). The one or more zones may be input or otherwise configured via the interface 220.

In an exemplary embodiment, the location device may be coupled to a vehicle owned by a car dealer, the inventory management system 100 may be configured with a zone comprising the car dealer's lot, and the zone may be associated with the location device and possibly other location devices owned or otherwise controlled by the dealer. The same or different zones may be configured for different types of dealer vehicles, for example service, loaner, and/or retail vehicles.

Figure 10:
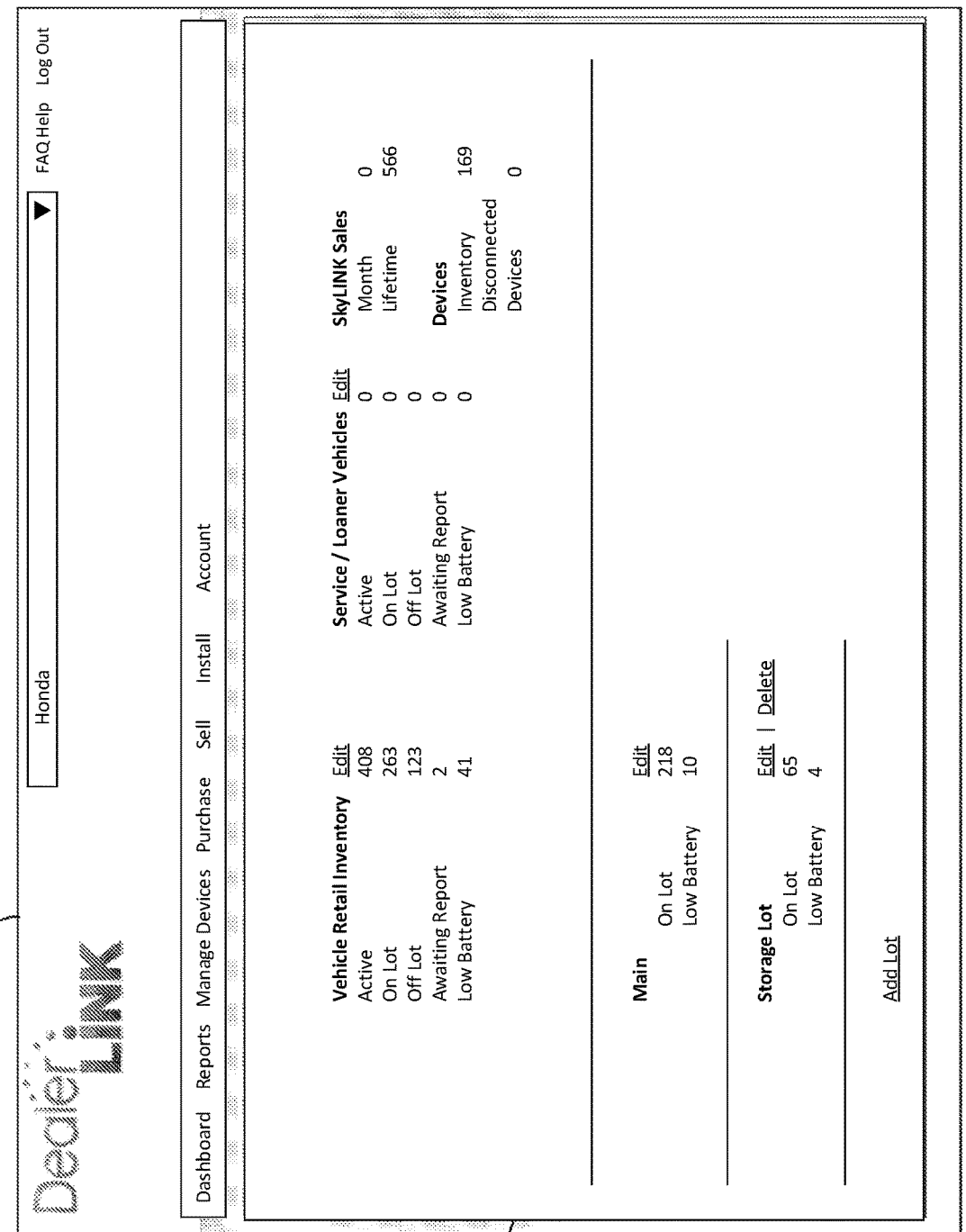
FIG. 10 representatively illustrates a first view of a user interface according to an exemplary embodiment of the present technology.

The inventory management system 100 may receive location information from the location device and/or retrieve stored recent location information, may compare (for example by the CMC 120) such location information to the one or more zones associated with the location device, and may determine if the location device (and therefore the vehicle) is or most recently was on or off the lot. This determined information may be presented on the interface 220, for example as shown in FIGS. 10 and 11, and other appropriate notifications and/or warnings may be issued. In one embodiment, if the inventory management system 100 (for example the CMC 120) determines that the location device is or most recently was outside of an acceptable zone and/or in an unacceptable zone, the inventory management system 100 may issue one or more commands to the location device, for example causing it to shut down the vehicle, reduce functionality of the vehicle, activate an alarm, and the like.

In an exemplary embodiment, the location device may be configured to store the one or more zones and may be configured to determine if it is located inside or outside of the one or more zones. The location device may be configured to store one or more attributes associated with the one or more zones, such as a zone name, if a particular zone is acceptable or unacceptable, and the like. The location device may be configured with the one or more zones, instead of or in addition to the inventory management system 100. For example, a user may use the interface 220 to configure the one or more zones and may specify which one or more location devices are to be associated with the one or more zones, the CMC 120 may review this information input via the interface 220, and may accordingly cause the one or more location devices to be programmed with the one or more zones, for example via the DTS 110 and the one or more networks 210, 310.

The inventory management system 100 may receive information from the location device corresponding to which zone the location device is in and/or is not in, and may determine if the location device is in an acceptable zone, unacceptable zone, and the like. Additionally or alternatively, the location device may determine if it is in an acceptable zone, unacceptable zone, and the like, and may transmit this determined information to the inventory management system 100. The CMC 120 may review the information received from the location device and may determine if a notification needs to be sent (e.g. to the interface 220), if a command needs to be sent to the location device, and the like. The location device may be configured with the zone information at any suitable time, for example before the location device is initially sent to a car dealer, when the device is first coupled with a vehicle, via a user interface, and the like.

As described above, one or more zones may be configured in the inventory management system 100. In some embodiments, when a device is coupled with an object the device is configured to report information on (for example, when a location device is first coupled with a vehicle), the inventory management system 100 may determine that a new device has been activated (for example by device discovery), and/or communication may begin between the device and the inventory management system 100. The one or more zones may then be loaded into the device and/or associated with the device and/or vehicle in the inventory management system 100. In one embodiment, a device instance may comprise a representation of one or more zones, and the device instance may be associated with one or more devices. For example, a device instance may define one or more zones representing one or more dealer lots, and may be associated with each vehicle owned by a dealer, such that when one of the dealer's location devices is coupled with a vehicle, the one or more zones are associated with the vehicle in the inventory management system 100 and/or the one or more zones are loaded into the location device.

Dealing with different devices and networks can become a burden to system developers, since each device may have a different communication protocol, and different networks have different interface requirements. One embodiment of the current system inventory management system 100 eliminates complexity providing a common interface for all devices regardless of protocol or network. The suite of software component's connectivity between client and server supports a myriad of common communication platforms. These communication platforms may comprise any appropriate platform, including but not limited to: XML, SOAP over HTTP, WSDL, UDDI, SMTP, binary encoding over TCP, ReFlex, GPRS, EDGE, Mobitex, CDMA, EVDO, VSAT, wired LAN, Wired WAN, and message queues via Microsoft Windows MSMQ or other appropriate application. Because the inventory management system 100 acts as an intelligent proxy between the client application and the device data network, any existing client interface can be accommodated. As discussed previously, data integrity can be managed via certificate-based encryption.

In one embodiment, the inventory management system 100 provides a common means of addressing devices that is independent of network addressing. Managing a disparate collection of IP addresses, telephone numbers, or other network identifiers is not needed. Each device is identified by a user-selected name. In one embodiment, the application connects to the inventory management system 100 and uses the common name to address the device. The CMC acquires the name in the database, replaces the name with the unique network identifier, and routes the message to the correct DTS instance. This simplifies addressing so that devices can be addressed in a common manner irrespective of what network is utilized. The application that interfaces with users need only know the common name of the device. No special accommodation is needed for compatibility with different networks. All networks are managed by a single connection to the inventory management system 100. Additionally, changes in devices or networks are insulated from a business application. For instance, if a device needs to be moved from one network to another, or replaced, it can keep the same common name. Any changes in addressing are done in the inventory management system 100.

In another embodiment, the inventory management system 100 provides a robust platform for message handling across any network. Message queues for multiple networks, with different packet sizes, latencies, and/or protocols can be processed. The inventory management system 100 handles all necessary message queuing, retries, and notifications. For instance, in one embodiment, devices operating on lower data rate networks such as ReFLEX may experience latencies on the order of 20 to 30 seconds before messages are delivered and confirmed, while devices on 3G networks may see latencies three orders of magnitude lower. In another embodiment, the inventory management system 100 manages the message queues for these different networks. Different networks have different interface methods, such as WCTP for ReFLEX networks, VPN for wired and wireless LAN, or private/public APN for cellular networks. The inventory management system 100 manages the different connection protocols and security requirements for these connections, again providing a single point of contact for all networks on which customer devices are being used. Some networks, such as ReFLEX or Mobitex, deliver messages to devices over a period of time. Other networks, such as IP-based cellular networks, may rely upon the client application to deliver messages. The device specific networks may comprise any appropriate networks, including but not limited to Skytel, USAM, Wyless, Sprint, Private LAN, T-Mobile, AT&T, Private VPN, and Private WAN.

The inventory management system 100 insulates a development team/or user from these differences. Many networks implement some form of broadcast messaging, but this feature is limited to devices upon that specific network. The inventory management system 100 according to various embodiments of the present invention facilitates broadcast messaging across diverse networks.

In one embodiment, the inventory management system 100 provides automatic configuration of telemetry communication devices. For instance, a device may load its parameters, data, and/or programming from the inventory management system 100. A user may preset a list of device names and tags into the database and the devices may auto configure based upon information stored in the database. This approach may provide scalability as individual components would not require preloading of data. For instance, a firm could have hundreds of identical or varied devices ready for installation. Once a device is installed or prior to installation, it may be given an identifier, such as a serial number. A user could call the identified DTS instances of one or many of the remotely located identical or different devices through the firm's web interface. The user's instance call or calls, once authenticated by the CMC, will locate the device and/or devices. The device or devices may then download preprogrammed operating parameters (parameters, data, programming, and/or the like) from the one or more databases of the present system and operate as desired.

In some embodiments, the device or devices may be programmed with one or more zones, to operate in a low-power mode, to provide a disconnect notice, and/or to return an identifier of the object the device is configured to report telemetry on. Alternatively, a device that is not called until needed, such as a stolen car location device, could be activated remotely in a similar manner. The device would download its specific data after activating and respond with appropriate information according to preprogramming. In this case, the appropriate information may comprise device location.

In one embodiment, a device may be programmed, for example with a script, to operate in a sleep mode, whether by the inventory management system 100, a user, a device manufacturer, and/or the like, and whether before or after installation in an object the device is configured to report information on. Operating in a sleep mode may comprise detecting a condition in which it would be desirable for the device to consume relatively low power, such as when an external power source (e.g. a vehicle battery) is low or dying, or if the device and/or object will not be used for a while. Determining that a battery is low or dying may comprise determining that the battery voltage and/or current are below a predetermined or dynamically chosen threshold. In one embodiment, the condition may comprise a command, for example entered via the interface 220, to operate in a sleep mode.

Operating in a sleep mode may further comprise the device entering a low-power, passive, sleep state, or similar mode of operation, waking up periodically, randomly, and/or based on any preset condition, checking in with the inventory management system 100 and/or the object to determine if any further actions need to be taken and/or information needs to be provided, and if no further actions need to be taken and/or information needs to be provided, entering into the low-power, passive, sleep state, or similar mode of operation. For example, the device may be configured to wake up during a predetermined time interval. The predetermined time interval may comprise any suitable combination of sleep mode and awake mode. For example, the predetermined time interval may comprise an hour of sleep mode followed by an hour of awake mode or fifty-five minutes of sleep mode followed by five minutes of awake mode.

Upon waking up, operating in a sleep mode may comprise taking one or more actions and/or providing information if needed, and then entering into the lower-power, passive, sleep state, or similar mode of operation. Operating in a sleep mode may further comprise a reduction or cessation of communication.

In one embodiment, the device may be configured (via programming or otherwise) to issue a low battery alert. Issuing a low battery alert may comprise any suitable message indicating that a battery for the device and/or a battery for the object the device is coupled with are low. The message may comprise an audible alert, a message issued through the system of the object (e.g. a message on a display screen of a vehicle the device is coupled with), a message to the inventory management system 100, and the like. In an embodiment, the low battery alert may be sent to the inventory management system 100 where the CMC 120 may review the message and take any appropriate actions, such as presenting a notice on the interface 220. In this way, the device and inventory management system 100 are able to provide a notice to a remote user that the tracked object, such as a vehicle, has a low battery. Once a low battery alert has been issued, the device may be configured to automatically operate in a sleep mode, and/or may be commanded to operate in a sleep mode from the inventory management system 100, for example in response to user input via the interface 220.

The inventory management system 100 may be configured to manage a vehicle inventory for a car dealer. The vehicle inventory may comprise dealer vehicles such as service and loaner vehicles, and may comprise retail vehicles. The inventory management system 100 may be configured to automatically associate and/or disassociate a vehicle and/or device with the dealer's vehicle inventory. A dealer may have a plurality of inventories, for example a first vehicle inventory for retail vehicles, a second vehicle inventory for service and loaner vehicles, and the like. A dealer may have a plurality of location devices associated with the plurality of the dealer's vehicle inventories. Each of the plurality of location devices may be configured to be associated with one of the plurality of dealer inventories.

In an exemplary embodiment, the inventory management system 100 may be configured to automatically associate (or "register" or "pair") a device with an object the device is configured to report telemetry on. For example, a location device may be assigned an identifier, such as a serial number, and the location device may be programmed or otherwise configured to retrieve the VIN of a vehicle when it is coupled with the vehicle, and to transmit to the inventory management system 100 the VIN and its own identifier. The CMC 120 may review this information from the location device, and may be configured to associate the device identifier with the VIN. The inventory management system 100 may already have the VIN and/or device identifier stored, for example in a database 130, and may associate the device identifier with the VIN by updating the database 130 accordingly. In an exemplary embodiment, the device may be owned by a car dealer, and the inventory management system 100 may be configured to remove the device from a group of available dealer devices, wherein available dealer devices refers to devices owned by the dealer that are currently not coupled with any vehicle. The group of available dealer devices may be identified in the database 130, for example by a status field associated with each device indicating that the device is disconnected.

The inventory management system 100 may be configured to manage a user account, and the VIN and/or device identifier may be associated with the user account, such as an account of the owner of the vehicle. In an exemplary embodiment, the VIN and/or device identifier may be stored by the inventory management system 100 and associated with the user account. If only the VIN is initially stored and associated with the user account, then associating the device identifier with the VIN effectively associates the device identifier with the user account. Similarly, if only the device identifier is initially associated with the user account, the associating the device identifier with the VIN effectively associates the VIN with the user account. In this manner, the VIN and/or the device identifier can be directly or indirectly associated with the user account.

In an exemplary embodiment, the inventory management system 100 may be configured to electronically communicate with a car dealer's dealership management system ("DMS"), and may be configured to query the DMS for information relating to one or more vehicles and/or configured to receive information updates from the DMS. In one embodiment, the DMS may comprise any system suitably configured to manage various activities a dealership, such as a conventional dealership management system. For example, the DMS may comprise one or more modules or systems configured to: maintain ownership information for vehicles, maintain information related to specific vehicles such as make, model, color, year, etc., and maintain service records. Furthermore, the DMS may comprise one or more modules or systems communicatively coupled to third party systems. For example, the DMS may comprise a system suitably configured to communicate with entities that offer finance, insurance, credit, payment systems, service and repair systems and the like for vehicles.

In an exemplary embodiment, upon change of ownership of the vehicle, the inventory management system 100 may be configured to associate the VIN and/or device identifier with the new owner, for example by associating the VIN and/or device identifier with the new owner's account. The inventory management system 100 may query the DMS to obtain ownership information for the past owner and/or a new owner. Once the ownership information is obtained, the inventory management system 100 may disassociate the VIN and/or device identifier with the previous owner's account. For example, when a dealer sells a vehicle to a new owner, the inventory management system 100 may remove the device and vehicle from the dealer's inventory, and may create an account for the new owner and may associate the device and vehicle with the new owner's account via the device identifier and/or the VIN.

In an exemplary embodiment, when a VIN and/or device identifier is disassociated with a previous owner or dealer and is now associated with a new owner or dealer, the inventory management system 100 may be configured to track information related to a new owner or dealer, as well as keeping a record of the previous owner or dealer. For example, the database 130 may be configured to keep track of a list of all owners/dealers who have been associated with the VIN and/or device identifier throughout the lifetime of the VIN and/or device identifier. In some embodiments, information about the VIN and ownership may be entered via the interface 220.

In response to being disconnected from a vehicle, the location device may be configured to transmit a disconnect notice, for example over the network and via a location device management module, to the inventory management system 100 indicating that the device has been disconnected. The location device management module manages the disposition of the location devices, such as by managing the allocation of location devices in a dealer's inventory, communicating with the location devices to track locations and/or device operations, and/or facilitating communications between the locations devices and other systems. In one embodiment, the location device management module comprises a software module configured to operate on the processor of the inventory management system 100. The location device management module may be communicatively configured to interact with the inventory management system 100, the interface 220, the DMS, the DTS 110, the CMC 120, the database 130, the location device, and/or any other system or device used by the inventory management system 100.

The inventory management system 100 may be further configured to store the disconnect notice in the database 130. For example, the database 130 may be configured to store information relating to the disconnect notice such as time of disconnect, geographical area/location where device was disconnected (e.g., did the disconnect occur within a predetermined geofence), identification of the specific location device being disconnected (e.g. serial number, VIN associated with the location device, and/or ownership information associated with the location device), and information relating the vehicle from which the location device was disconnected from. The disconnect notice may comprise any suitable system configured to identify which vehicle the location device was last associated with. For example, the disconnect notice may comprise a device identifier and/or the VIN associated with the location device. Upon receiving the disconnect notice, the inventory management system 100 may determine, based on the information received from the location device, which dealer the device last belonged to (e.g. was last associated with in memory) and may query the determined dealer's DMS for information relating to the ownership of the vehicle.

For example, if the location device sent a disconnect notice with its device identifier, the inventory management system 100 may be configured to determine the vehicle/owner associated with that particular device identifier. Likewise, if the location device sent a disconnect notice with its VIN, the inventory management system 100 may be configured to determine the vehicle/owner associated with that particular VIN. Upon receiving information from the DMS that the vehicle is still owned by the dealer, the inventory management system 100 may report, for example via the interface 220, that the device has been disconnected and may add the device to a group of available dealer devices. In an exemplary embodiment, the location database 130 may still retain a record for each device of the one or more vehicles the device was previously associated with, to facilitate finding a lost device, tracking the history of the device, and so on. Upon receiving information from the DMS that the vehicle is not owned by the dealer, the inventory management system 100 may perform no action, or associate the location device with the user account of the vehicle's new owner.

The inventory management system 100 may be configured to generate a report comparing the device and/or vehicle inventory and status as stored by the inventory management system 100 for a dealer to the device and/or vehicle inventory and status stored by the dealer's DMS. This may allow a dealer to determine any inaccuracies in the device and/or vehicle inventory stored by the dealer's DMS, and to correct such information as necessary. While the examples described above are in relation to a vehicle, the device and inventory management system 100 may be configured as described for any object comprising an identifier that may be determined by the device.

Additionally, historical data can be called from the database by a user. For instance, if a user such as a business owner wishes to determine the whereabouts of his location device equipped delivery vehicle over a particular historical period route information such as time between stops, vehicle speed/or variance outside of a preprogrammed boundary (e.g. zone) could be requested, located, and/or returned. In an exemplary embodiment, a user may request current and/or historical location and/or other information corresponding to the vehicle by entering part of the vehicle's VIN (e.g., the last few digits of the vehicle's VIN), and the inventory management system 100 may locate and return the requested information to the user.

Some embodiments may utilize the .NET Framework which provides a class hierarchy on which programs are built. The .NET Framework provides a layer of abstraction over an operating system, making .NET programs platform independent. The framework's Base Class Library provides a large range of features including user interface, data and data access, database connectivity, cryptography, web application development, numeric algorithms, and network communications. The class library may be used by programmers, who combine it with their own code to produce applications. Some programs written for the .NET Framework execute in a software environment that manages the program's runtime requirements. This runtime environment is known as the Common Language Runtime (CLR). The CLR provides the appearance of an application virtual machine so that programmers need not consider the capabilities of the specific CPU that will execute the program. The CLR also assists with other important services such as security, memory management, and exception handling. The class library and the CLR together comprise the .NET Framework.

The core aspects of the .NET Framework lie within the Common Language Infrastructure, or CLI. The purpose of the CLI is to provide a language-neutral platform for application development and execution, including functions for exception handling, garbage collection, security, and interoperability. Microsoft's implementation of the CLI is called the CLR. It provides classes to build distributed applications, as well as network services that send messages over channels. The .NET Framework includes remoting in the CLR. A .NET program can run on any platform the .NET Framework resides on. .NET languages comprise Visual Basic .NET (VB.NET) and C#. Visual Basic .NET is a language based of Visual Basic 6.0, allowing relatively easy porting of Visual Basic code to .NET. C# (pronounced C-Sharp), is another language based off C, C++, and Java. ASP.NET may also be implemented in some embodiments to among other things assist with web page or interface postbacks and caching. Also, ADO.NET may be utilized to assist communication with the database and/or databases. With ADO.NET once information has been requested, the client disconnects from the server while processing the information. Then, the client reconnects to the server to deliver any changes to the data to the server.

The intermediate CIL code may housed in .NET assemblies. As directed by specification, assemblies are stored in the Portable Executable (PE) format, common on the Windows platform for DLL and EXE files. The assembly may consist of one or more files, one of which generally contains the manifest, which has the metadata for the assembly. The complete name of an assembly contains its simple text name, version number, culture, and public key token. The public key token is a unique hash generated when the assembly is compiled, thus two assemblies with the same public key token are guaranteed to be identical from the point of view of the framework. A private key can also be specified known only to the creator of the assembly and can be used for strong naming and to guarantee that the assembly is from the same author when a new version of the assembly is compiled (required addition of an assembly to the Global Assembly Cache).

CLI may be self-describing through .NET metadata. The CLR checks the metadata to verify the correct method is called. Metadata is usually generated by language compilers but developers can create their own metadata through custom attributes. Metadata contains information about the assembly, and is also used to implement the reflective programming capabilities of .NET Framework.

.NET has its own security mechanism with two general features: Code Access Security (CAS), and validation and verification. Code Access Security is based on evidence that is associated with a specific assembly. Typically the evidence is the source of the assembly (whether it is installed on the local machine or has been downloaded from the intranet or Internet). Code Access Security uses evidence to determine the permissions granted to the code. Other code can demand that calling code is granted a specified permission. The demand causes the CLR to perform a call stack walk: every assembly of each method in the call stack is checked for the required permission; if any assembly is not granted the permission a security exception is thrown.

When an assembly is loaded, the CLR performs various tests. Two such tests are validation and verification. During validation the CLR checks that the assembly contains valid metadata and CIL, and whether the internal tables are correct. The verification mechanism checks to see if the code does anything that is 'unsafe'. Unsafe code will only be executed if the assembly has the 'skip verification' permission, which generally means code that is installed on the local machine.

.NET Framework uses appdomains as a mechanism for isolating, code running in a process. Appdomains can be created and code loaded into or unloaded from them independent of other appdomains. This helps increase the fault tolerance of the application, as faults or crashes in one appdomain do not affect rest of the application. Appdomains can also be configured independently with different security privileges. This can help increase the security of the application by isolating potentially unsafe code. The developer, however, has to split the application into subdomains; it is not done by the CLR.

The .NET Framework includes a set of standard class libraries. The class library is organized in a hierarchy of namespaces. Most of the built in APIs are part of either System or Microsoft namespaces. These class libraries implement a large number of common functions, such as file reading and writing, graphic rendering, database interaction, and XML document manipulation, among others. The .NET class libraries are available to all .NET languages. The .NET Framework class library is divided into two parts: the Base Class Library and the Framework Class Library.

The Base Class Library (BCL) includes a small subset of the entire class library and is the core set of classes that serve as the basic API of the Common Language Runtime. The classes in mscorlib.dll and some of the classes in System.dll and Systent.core.dll are considered to be a part of the BCL. The BCL classes are available in both .NET Framework as well as its alternative implementations including .NET Compact Framework, Microsoft Silverlight and Mono.

The Framework Class Library (FCL) is a superset of the BCL classes and refers to the entire class library that ships with .NET Framework. It includes an expanded set of libraries, including WinForms, ADO.NET, ASP.NET, Language Integrated Query, Windows Presentation Foundation, Windows Communication Foundation among others. The FCL is much larger in scope than standard libraries for languages like C++, and comparable in scope to the standard libraries of Java.

The .NET Framework CLR frees the developer from the burden of managing memory (allocating and freeing up when done); instead it does the memory management itself. To this end, the memory allocated to instantiations of .NET types (objects) is done contiguously from the managed heap, a pool of memory managed by the CLR. As long as there exists a reference to an object, which might be either a direct reference to an object or via a graph of objects, the object is considered to be in use by the CLR. When there is no reference to an object, and it cannot be reached or used, it becomes garbage. However, it still holds on to the memory allocated to it. .NET Framework includes a garbage collector which runs periodically, on a separate thread from the application's thread, that enumerates all the unusable objects and reclaims the memory allocated to them.

The .NET Garbage Collector (GC) is a non-deterministic, compacting, mark-and-sweep garbage collector. The GC runs only when a certain amount of memory has been used or there is enough pressure for memory on the system. Since it is not guaranteed when the conditions to reclaim memory are reached, the GC runs are non-deterministic. Each .NET application has a set of roots, which are pointers to objects on the managed heap (managed objects). These include references to static objects and objects defined as local variables or method parameters currently in scope, as well as objects referred to by CPU registers. When the GC runs, it pauses the application, and for each object referred to in the root, it recursively enumerates all the objects reachable from the root objects and marks them as reachable. It uses .NET metadata and reflection to discover the objects encapsulated by an object, and then recursively walk them. It then enumerates all the objects on the heap (which were initially allocated contiguously) using reflection. All objects not marked as reachable are garbage. This is the mark phase. Since the memory held by garbage is not of any consequence, it is considered free space. However, this leaves chunks of free space between objects which were initially contiguous. The objects are then compacted together, by using memory to copy them over to the free space to make them contiguous again. Any reference to an object invalidated by moving the object is updated to reflect the new location by the GC. The application is resumed after the garbage collection is over.

The GC used by .NET Framework is actually generational. Objects are assigned a generation; newly created objects belong to Generation 0. The objects that survive a garbage collection are tagged as Generation 1, and the Generation 1 objects that survive another collection are Generation 2 objects. The .NET Framework uses up to Generation 2 objects. Higher generation objects are garbage collected less frequently than lower generation objects. This helps increase the efficiency of garbage collection, as older objects tend to have a larger lifetime than newer objects. Thus, by removing older (and thus more likely to survive a collection) objects from the scope of a collection run, fewer objects need to be checked and compacted.

Figure 6:
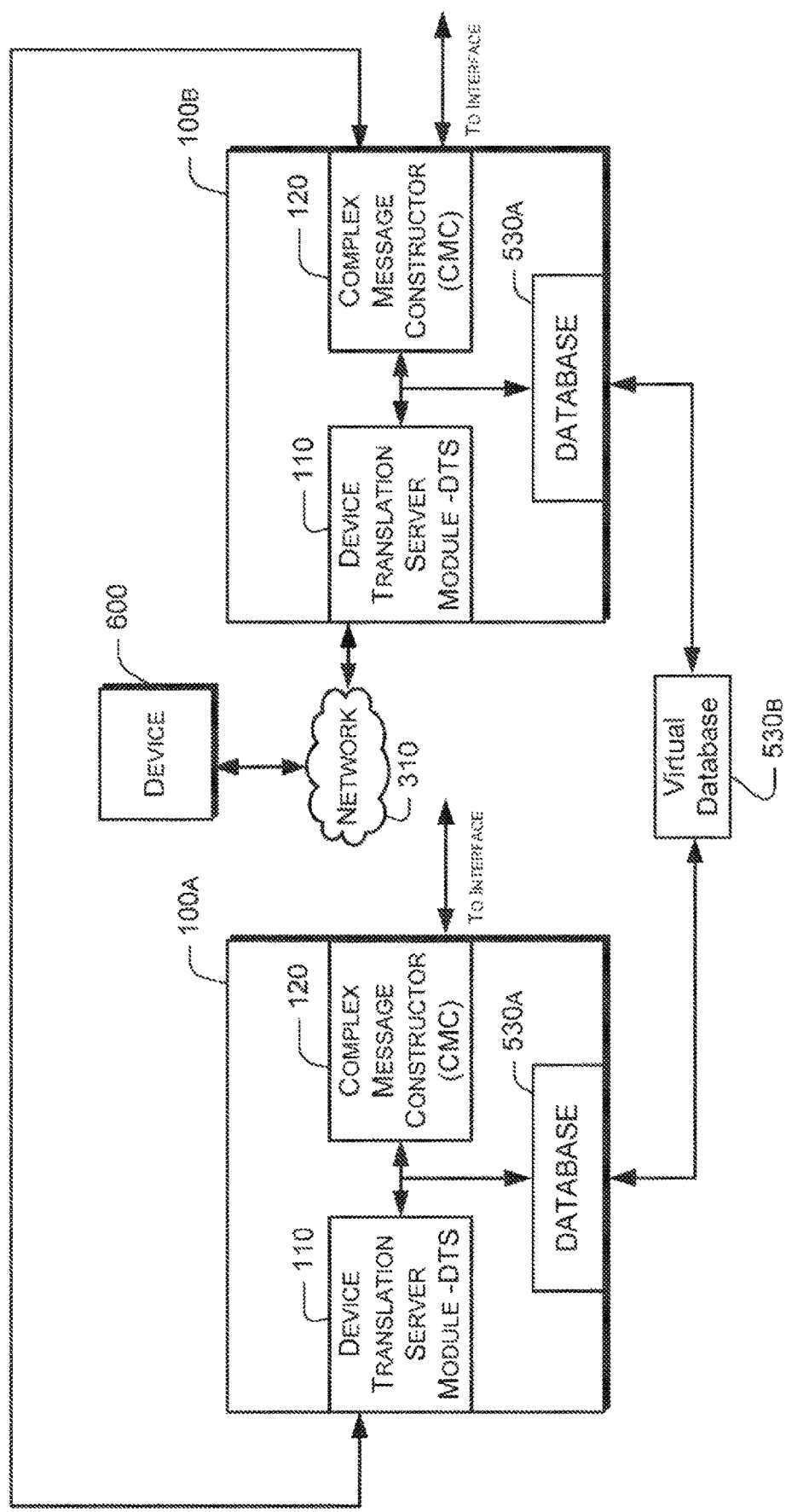
FIG. 6 shows a diagram illustrating an embodiment of an inventory management system configured to provide a network of networks for machine-to-machine network connectivity.
Figure 7:
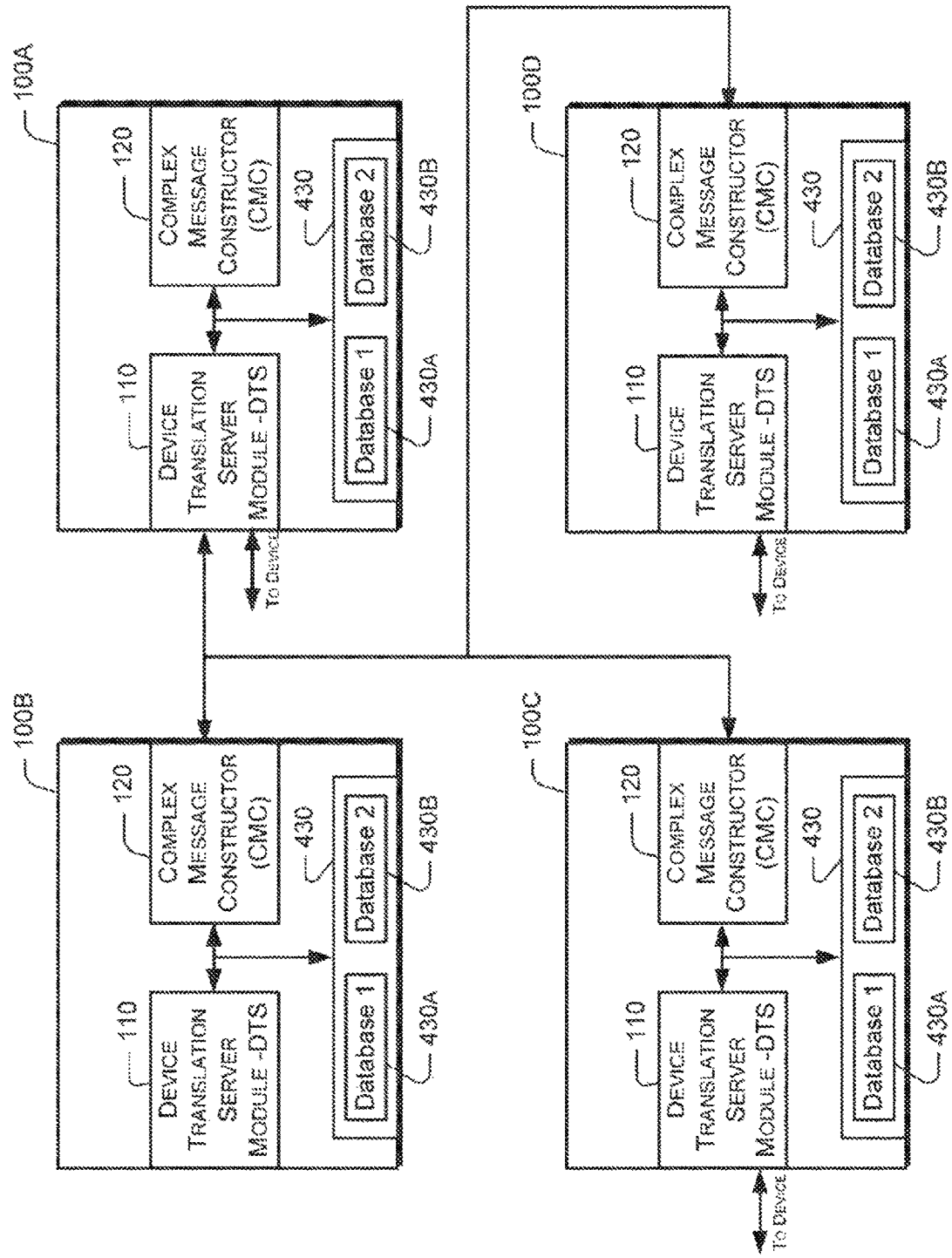
FIG. 7 provides another diagram illustrating an embodiment of an inventory management system configured to provide a network of networks for machine-to-machine network connectivity.

As shown in FIGS. 6 and 7, a network of networks of software suites can be created by linking the DTS's and CMC's of more than one suite of software suites (100A, 100B); and virtual databases 530B may be shared by multiple software suite instances. For example, in environments with security concerns and multiple distributed locations such as corporations with multiple offices the format shown in FIG. 7 may be implemented. In this embodiment, the DTS of inventory management system 100. A is coupled to the CMCs of inventory management system 100B, 100C, and 100D. This facilitates the inventory management system 100A can control, query, and save information on the devices coupled to inventory management system 100B, 100C, and 100D. The illustrated system configuration can be scaled up or down as needed by adding or subtracting additional components to and from the inventory management system 100. Or, an implementation of additional components may be added for quick scalability of a replicated system.

Figure 8:
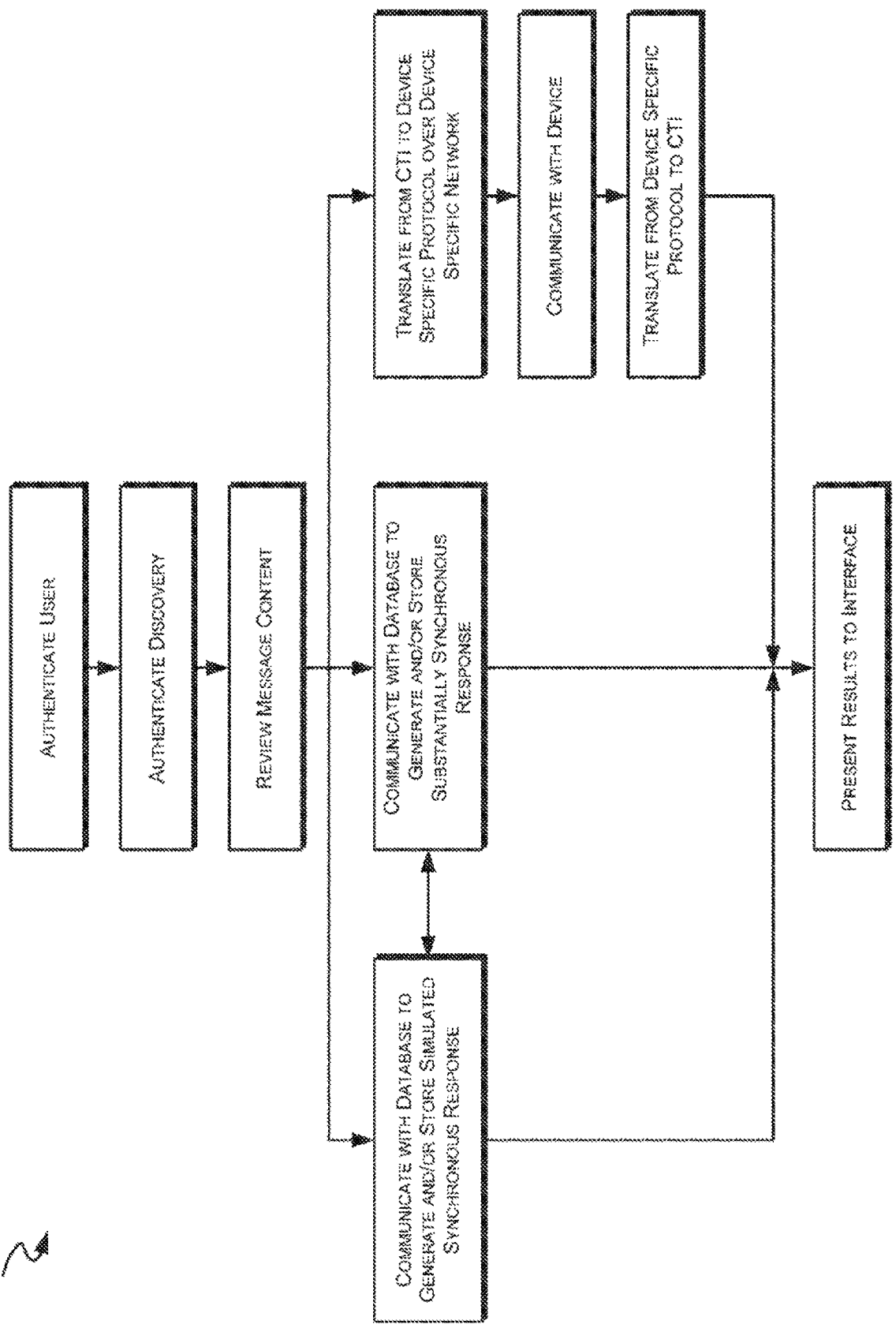
FIG. 8 illustrates a flow chart showing a method for an interface-initiated requests to a system configured to provide machine-to-machine network connectivity.

FIG. 8 depicts a flow chart 800 illustrating a method for an interface-initiated system configured to provide machine-to-machine network connectivity, where a message is sent through an interface. The message may comprise a request, command, instruction, query, and/or the like. The message may be a request for data, device initiation or control, status, physical location, location with respect to one or more zones, may be a command to program the device, disable an object the device is coupled with, and/or any other appropriate message to a device. The CMC may authenticate the permission and security of the user accessing the system as set out by a predetermined security protocol or access control list (ACL). The CMC may also verify the user access level within the system. Additionally, if desired, the CMC will review the content of the message request for any additional routing or action needed. The CMC may query the database and/or prepare the request for communication with the device. If the user requests data from the database, the data may be queried, and a reply may be delivered to the interface. If requesting substantially real-time device information, the request will be translated into the correct device and/or devices specific protocol and delivered over the proper network or networks for the device and/or devices. Preprogrammed economics, delivery success, and speed of transfer may be evaluated to determine which network to utilize if multiple networks are available for the device and/or devices. The information requested may be stored in the database and provided to the interface. If the information requested from the database and/or device is for substantially real-time data and substantially real-time data is unavailable, simulated synchronous information may be delivered to the user.

Figure 9A:
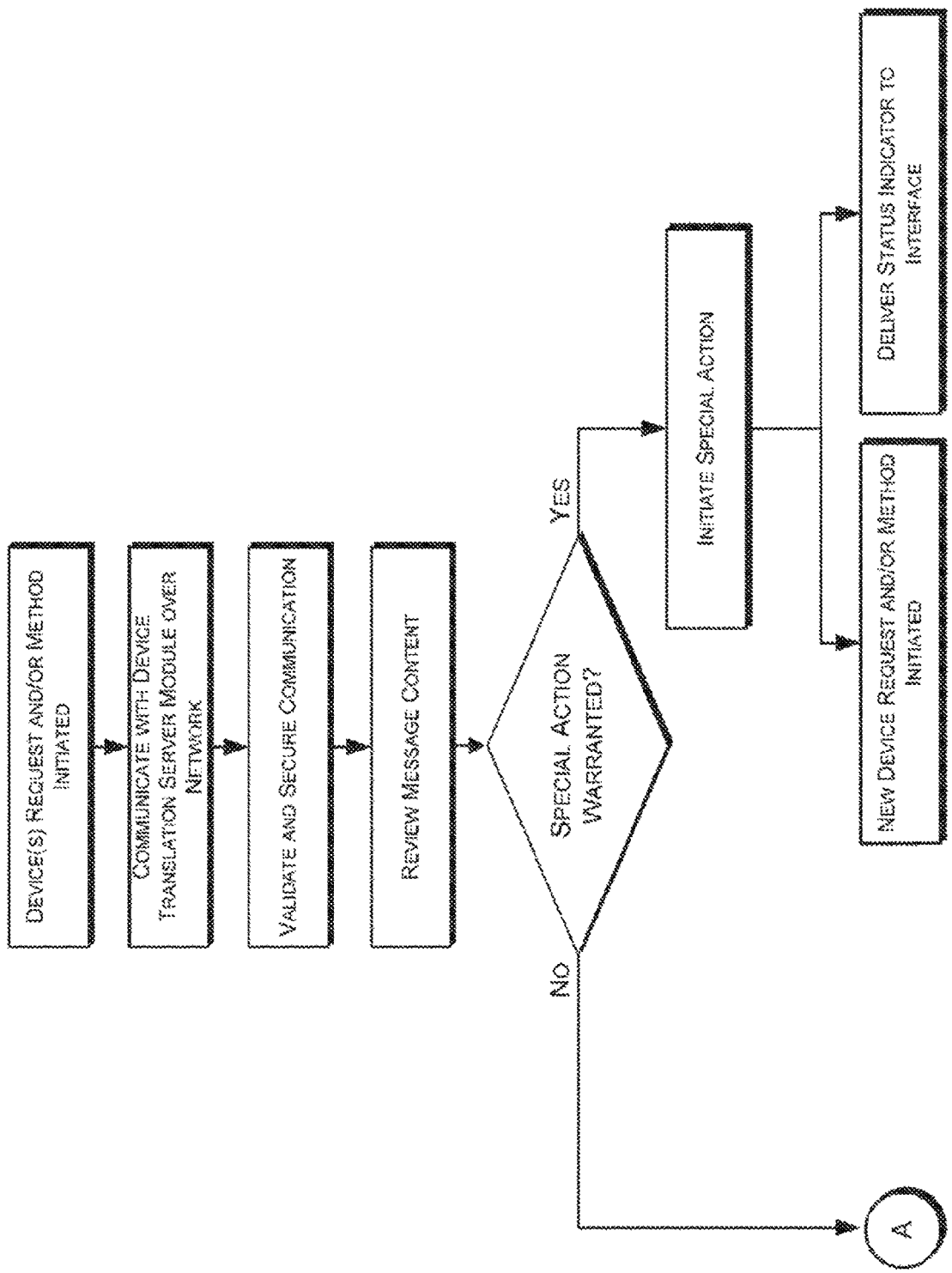
FIGS. 9A and 9B represent a flow chart illustrating another method for a device-initiated request to a system configured to provide machine-to-machine network connectivity.
Figure 9B:
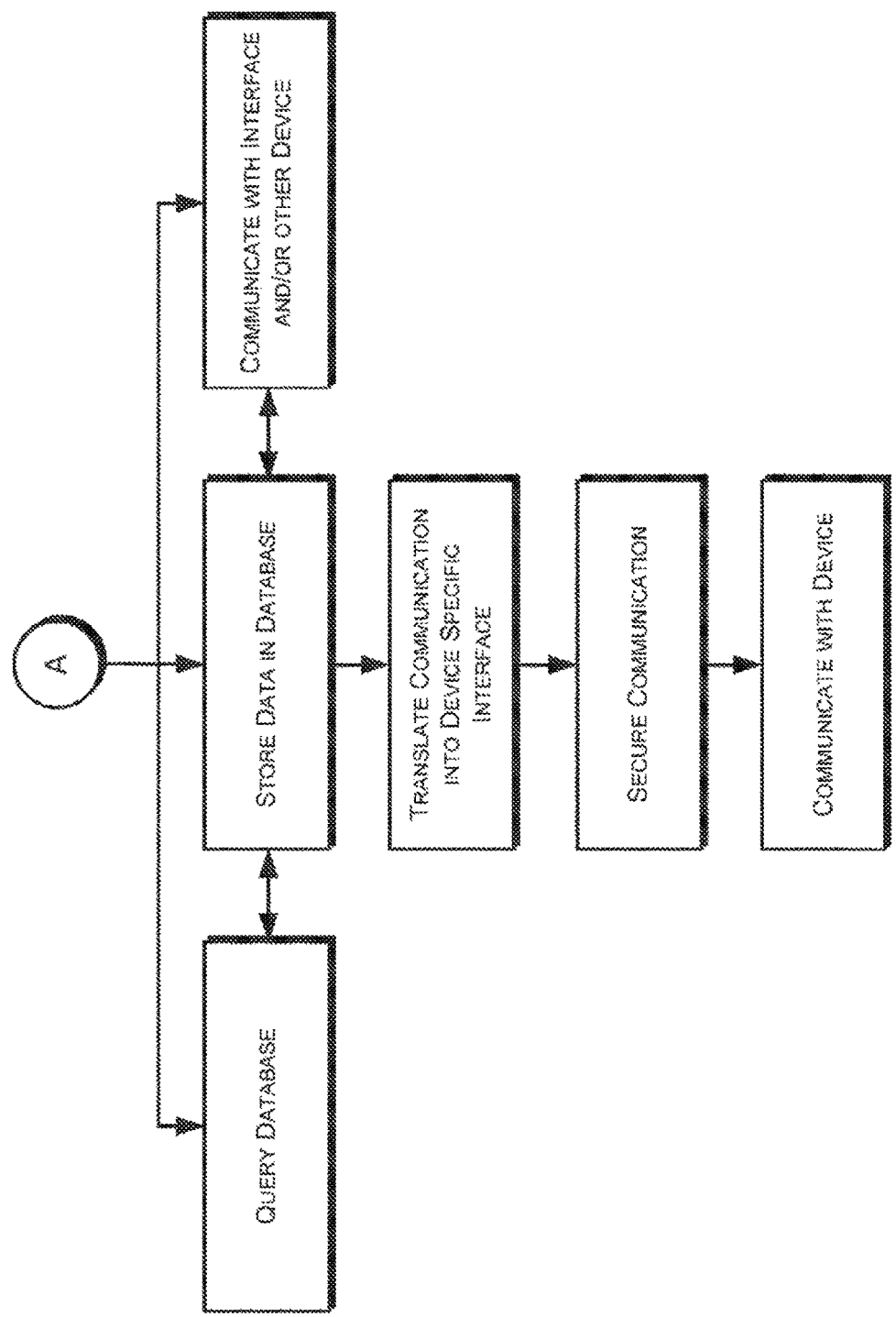

FIGS. 9A-9B depict a flow chart 900 illustrating another method for a device initiated request to a system configured to provide machine-to-machine network connectivity. In this embodiment, a device initiates a request and/or method to the system, which may comprise sending status, measurements, and/or any other relevant information. The device sends its request in a device specific protocol over the device specific network to the DTS. The DTS in concert with the CMC validates and secures the communication. The DTS translates the request and/or method into the CTI. The method or request stores data in the database, retrieves data from the database, communicates with the interface and/or an additional device. The data is translated into the device specific protocol over the device specific network. Preprogrammed economics, delivery success, and speed of transfer may be evaluated and determine which network with which to communicate if multiple networks are available for the device and/or devices.

In one embodiment, an implementation of the system may include a user in a company who wishes to determine the whereabouts of his fleet of vehicles equipped with a location device, and possibly operating data devices. In some embodiments, the location device may comprise a memory or other suitable system for recording operating data of the vehicle. The user may utilize a preprogrammed graphical user interface such as a web interface and/or mobile computing device application to query the historical location of vehicles 1, 4, and 13, of his 20 vehicle fleet. Using the system configured to provide machine-to-machine network connectivity, the user may select the appropriate dropdowns, enter the information from a set interval, and/or toggle the interactive GUI to format the request as desired. The request is checked for security authorization and user permissions by the CMC. Once the request is validated that the user has the appropriate permission for device discovery and the messages is sufficiently secured the CMC queries the database such as the system data facility for the historical stored data that has been automatically requested, at set periods or otherwise, by the system configured to provide machine-to-machine network connectivity.

In some embodiments, the device may be configured, for example by programming, to send unrequested any relevant information to the inventory management system 100, whether periodically or otherwise, and the inventory management system 100 may be configured to store such information provided by the device. In an exemplary embodiment, the location device may be configured to report in periodically (for example every 24 or 26 hours) and in response to certain events, such as the vehicle ignition being turned on or off, the vehicle battery going below a certain threshold voltage, the vehicle meeting or exceeding a predetermined speed threshold, the vehicle entering or exiting a geofence, and the like. The historical location data is retrieved and sent to the interface where it is organized and displayed as a map depicting the trails of the vehicles in individual colors. The CMC 120 may also retrieve (e.g. from the database and/or each location device) and send to the interface 220 the one or more zones associated with the one or more location devices in combination with the trails of the vehicles. The interface 220 may present this information in any suitable manner, for example displaying the zones on the map, displaying a status indicator if a vehicle is on or off a fleet vehicle lot and/or in a non-allowed area, and the like.

Next, the user may request the current location of vehicles 2 and 3. The request is checked for security authorization and user permissions by the CMC. Once the request is validated that the user has the appropriate permission for device discovery and the messages are sufficiently secured, the CMC communicates with the DTS to translate the CTI request to a device specific protocol and device specific network. Vehicle 2 and vehicle 3 may be both equipped with telemetry location devices of a different make and model. The substantially real-time information on vehicle 2 may be available while the substantially real-time location information for vehicle 3 may be currently unavailable. The DTS may translate the retrieved information for vehicle 2 into CTI and store it in the database. The CMC may send substantially synchronous information to the interface for vehicle 2 and simulated synchronous location information for vehicle 3 indicating time that the data was last verified current. The CMC 120 may also retrieve and send to the interface 220 the one or more zones associated with the location devices of vehicle 2 and vehicle 3, and the interface may present such information in any suitable manner.

Figure 13:
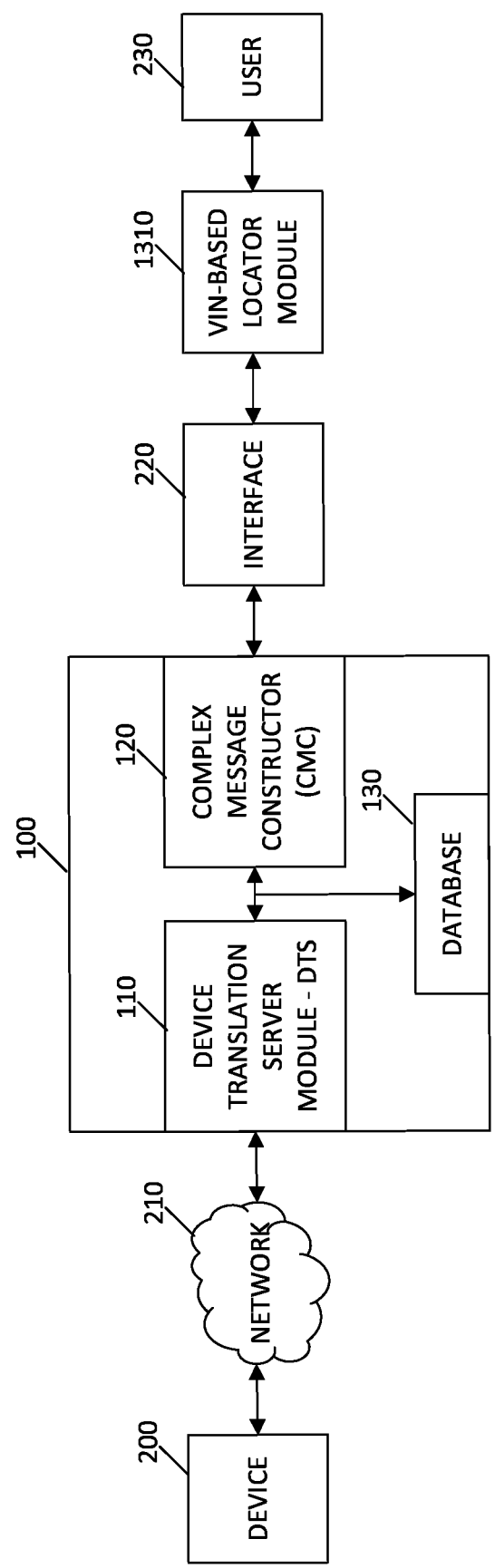
FIG. 13 representatively illustrates a VIN-based locator module according to an exemplary embodiment of the present technology.

In an exemplary embodiment, interface 220 may be configured to receive from a requestor some or all of an identifier of an object a device is configured to report information on and to present information corresponding to the object, and the inventory management system 100 may be configured to receive the partial or complete identifier, determine the device associated with the complete or partial identifier, retrieve information corresponding to the determined device, and send the retrieved information to the interface 220 to be presented. For example, referring now to FIG. 13, a location device may be coupled to a vehicle, and the interface 220 may be configured to receive, for example over the network and via a user interface communicatively coupled to a VIN-based locator module 1310, part of a VIN.

In one embodiment, the VIN-based locator module 1310 may comprise any system suitably configured to receive an input and identify a vehicle based on the input. For example, the VIN-based locator module 1310 may be communicatively coupled to the interface 220 and integrated into the inventory management system 100. The VIN-based locator module 1310 may receive a search request from the interface 220 via a user 230 initiated search request. The inventory management system 100 may be configured to determine the complete VIN from the partial VIN received via the VIN-based locator module 1310 and/or to identify the location device coupled to the vehicle having the partial or complete VIN, to retrieve the current and/or historical location of the vehicle (or any other suitable information), and to send the retrieved information to the interface 220, which may be configured to present the retrieved information in the form of a map, text-based address, and/or in any other suitable manner.

In an exemplary embodiment, the inventory management system 100 may be configured to determine the vehicle associated with the partial VIN by comparing the partial VIN to the VIN of all vehicles associated with the user requesting the information via the interface 220, and finding the vehicle that has a VIN containing the partial VIN. The partial VIN received via the VIN-based locator module 1310 may comprise a partial consecutive VIN sequence (e.g., "123" of the full VIN "1234567") and/or comprise a disjointed VIN sequence (e.g., "1" and "67" of the full VIN "1234567"). For example, the inventory management system 100 may be configured to search for a vehicle having a VIN comprising the numbers "1" followed by "67" at some point. The VIN-based locator module 1310 may be configured with Boolean search operators such as "containing this sequence," "without this sequence," "equal to, "not equal to," and the like to narrow down the search results. There may be a very low chance that more than one vehicle associated with the user shares the same partial VIN. In an embodiment, the interface 220 may be configured to receive the last six digits of the VIN and the inventory management system 100 may be configured to retrieve information based on the last six digits of the VIN. In an embodiment, the interface 220 may comprise a software application operating on a mobile computing device, such as a smart phone, smart watch, and the like.

Referring now to FIG. 10, the interface 220 may present a summary of information ("dashboard") 1010 corresponding to one or more devices. In the example shown in FIG. 10, the dashboard presents information corresponding to a plurality of vehicles owned by a dealer. The information may comprise the number of devices currently being used in vehicles ("active"), zone information such as number of vehicles on and off one or more dealer lots, low battery notices, number of devices that have been coupled with a vehicle but have not yet communicated status information to the inventory management system 100, how many devices are in inventory (e.g. not yet coupled with a vehicle), and the like. The dashboard 1010 may present an option for a user to "drill down" to find more information, such as via a hyperlink. For example, the dashboard 1010 may comprise a number of active devices, and the number may comprise a hyperlink to more information. A user wishing to find out more information about the active devices may activate the hyperlink.

Referring to FIG. 11, when the hyperlink is activated, the interface 220 may present more detailed information about the active devices, such as the VIN associated with each active device, whether each associated vehicle is on or off a dealer lot, the serial number of each device, when each device was coupled with the vehicle, the type of dealer vehicle (e.g. retail, loaner, service, etc.), and the like.

Figure 12:
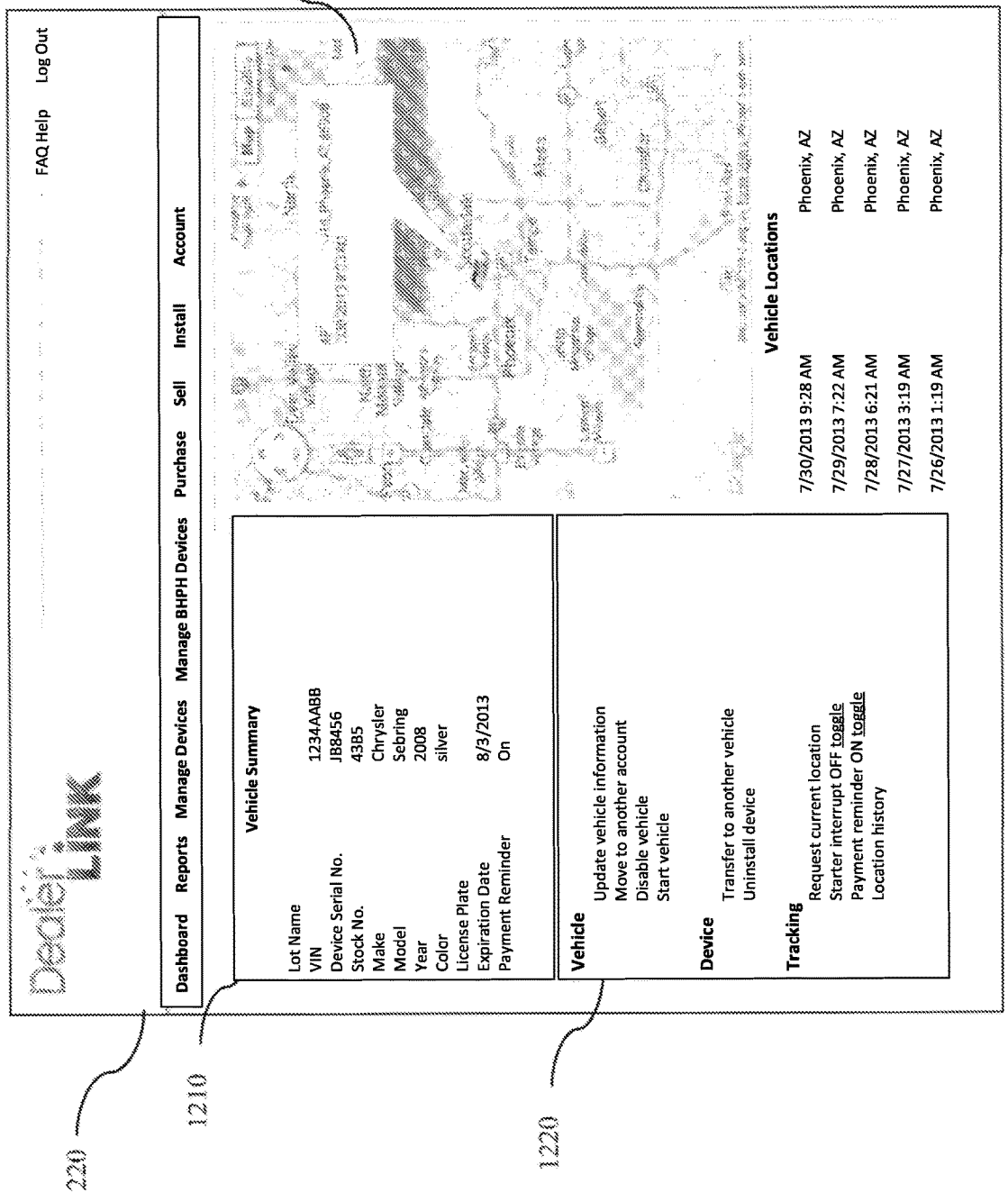
FIG. 12 representatively illustrates a third view of a user interface according to an exemplary embodiment of the present technology.

As with the dashboard 1010, the interface 220 may provide an option for the user to "drill down" even further to obtain more information. For example, when a hyperlink 1110 associated with a device/vehicle pair is activated, information for the device/vehicle pair may be shown. Referring to FIG. 12, information for the device/vehicle pair may comprise a summary 1210 having information such as VIN, device serial number, make, model, year, license plate, payment reminder status, and the like. Information for the device/vehicle pair may comprise management options, such as updating vehicle information, transferring the device to another vehicle, transferring the vehicle to another account, requesting current location, enabling or disabling a starter interrupter, and the like. Information for the device/ vehicle pair may comprise location information, such as a map and/or text indicating the current and/or historical locations of the vehicle.

While various embodiments of the present technology have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, alternative functional, logical, or physical partitioning and configurations can be implemented to implement the desired features. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the technology is described above in terms of various exemplary embodiments and implementations, the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that are known, such technologies encompass those known now or at any time in the future.

A group of items linked with the conjunction "and" should not be read as requiring that each and every one those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. In addition, the phrases "coupled with" and "coupled to" are used synonymously, and the terms "information" and "data" may be used interchangeably.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. The illustrated embodiments and their various alternatives can be implemented without confinement to the illustrated examples. For example, block diagrams and their accompanying description should not be construed as mandating a particular architecture or configuration.

The present technology can be practiced by other than the various embodiments and preferred embodiments, which are presented in this description for purposes of illustration and not of limitation, and the present technology is limited only by the claims that follow. It is noted that equivalents for the particular embodiments discussed in this description may practice the technology as well. Therefore, the present technology should not be seen as limited to the forms shown, which are to be considered illustrative rather than restrictive.

The particular implementations shown and described are illustrative of the technology and its best mode and are not intended to otherwise limit the scope of the claims in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing description, the technology has been described with reference to specific exemplary embodiments. Various modifications and changes may be made, however, without departing from the scope of the claims as set forth. The description and figures are to be regarded in an illustrative manner rather than a restrictive one, and all such modifications are intended to be included within the scope of the present technology. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present invention and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required, or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology.

What is claimed is:

1. A method for managing a vehicle inventory for a dealer implemented by a computer having a processor and a memory, wherein a location device is associated with a dealer's group of available location devices in the memory, and is configured to transmit a connection notice comprising a location device identifier, the method comprising:
   receiving, by the computer, the connection notice from the location device over a network;
   associating, by the processor, the location device identifier with a vehicle identifier in the memory;
   disassociating the location device from the dealer's group of available location devices;
   receiving, by the computer, a current location information from the location device;
   receiving a disconnect notice from the location device over the network;
   determining, based on the location device identifier, the vehicle with which the location device was most recently associated;
   querying a dealer management system associated with the vehicle for ownership information for the vehicle;
   receiving the ownership information;
   determining the vehicle is owned by the dealer according to the ownership information; and
   associating the location device with the dealer's group of available location devices in the memory.

2. The method of claim 1 further comprising:
   installing the location device in a vehicle,
   communicatively coupling the location device with the vehicle upon installation, and
   transmitting by the location device the connection notice in response to the location device becoming communicatively coupled with the vehicle.

3. The method of claim 1 further comprising the computer receiving the vehicle identifier over the network, wherein the vehicle identifier is entered through a user interface that is in communication with the computer via the network.

4. The method of claim 3 wherein the user interface comprises a mobile communication device.

5. The method of claim 1 wherein the vehicle identifier comprises a VIN of a vehicle in the vehicle inventory in which the location device is installed and the location device identifier comprises a location device serial number.

6. The method of claim 1 wherein:
   each of a plurality of vehicle inventories is associated with one of a plurality of dealers; and
   each of a plurality of location devices is associated with one of a plurality of dealers.

7. The method of claim 1 further comprising:
   receiving updated ownership information for the vehicle;
   determining based on the updated ownership information that the vehicle has a new owner;
   creating, by the processor, a user account;
   associating the user account with the new owner;
   associating the vehicle and location device with the user account; and
   disassociating the vehicle and location device with the dealer in the memory.

8. The method of claim 1 wherein the vehicle is associated in the memory with location information received from the location device and stored in the memory, the method further comprising:
   receiving, by a user interface communicatively coupled with the computer, a partial or complete vehicle identifier;
   identifying, by the processor, the vehicle associated with the partial or complete vehicle identifier;
   retrieving, by the processor, the most recent location information from the plurality of location information; and
   presenting the retrieved location information by the user interface.

9. The method of claim 1 wherein the location device is configured to determine a voltage of the vehicle battery, the method further comprising:
   determining that the voltage is below a predetermined threshold;
   configuring the location device to:
     transmit, to the computer, an indication of a low battery state; and
     enter a power-saving mode.

10. A network-enabled management system for managing a dealer's inventory of vehicles, comprising:
   a location device that is selectably connectable to a vehicle in the dealer's inventory of vehicles, wherein the location device is configured to:
     determine a physical location of the location device; and
     transmit a connection notice comprising a location device identifier over the network; and
   an inventory management system configured to receive the transmitted connection notice, wherein the inventory management system comprises:
     a translation server module configured to translate the transmitted connection notice from a first interface protocol into a second interface protocol; and
     a database configured to:
       store the received connection notice;
       associate a vehicle identifier with the location device identifier; and
       store information related to the location device,
   wherein the inventory management system is further configured to:
     receive from the location device and over the network a disconnect notice comprising the location device identifier;
     query the database for the vehicle the location device was most recently associated with based on the received location device identifier: retrieve ownership information for the identified vehicle;
     determine that the vehicle is owned by the dealer according to the retrieved ownership information; and associate the location device with a dealer's group of available location devices in the database.

11. The system of claim 10, wherein the location device is operable to be communicatively coupled with the vehicle, and the location device transmits the connection notice in response to the location device becoming communicatively coupled with the vehicle.

12. The system of claim 10 wherein the inventory management system is configured to:
receive the vehicle identifier over the network, wherein the vehicle identifier is entered through a user interface that is in communication with the inventory management system via the network; and
associate the vehicle identifier with the location device identifier in the database.

13. The system of claim 12 wherein the user interface comprises a mobile communication device.

14. The system of claim 10 wherein the vehicle identifier comprises a VIN of a vehicle, and the location device identifier comprises a location device serial number.

15. The system of claim 10 wherein:
the database stores information relating to a plurality of vehicle inventories, wherein each of the plurality of vehicle inventories is associated with one of a plurality of dealers; and
the location device is associated in the database with one of a plurality of dealers.

16. The system of claim 10 wherein the inventory management system is configured to:
receive, over the network, updated ownership information for the vehicle;
determine based on the updated ownership information that the vehicle has a new owner;
create a user account for the new owner in the database;
associate the user account with the new owner;
associate the vehicle and the location device with the user account; and
disassociate the vehicle and the location device with the dealer.

17. The system of claim 10 wherein the inventory management system is configured to:
receive, over the network and via a user interface communicatively coupled to the inventory management system, a partial or complete vehicle identifier;
query the database for the vehicle associated with the partial or complete vehicle identifier;
retrieve the most recent location information for the vehicle from the database; and
present the retrieved location information via the user interface.

18. The system of claim 10 wherein the location device is configured to:
determine a voltage of at least one of a vehicle battery and a location device battery;
determine that the voltage is below a predetermined threshold;
transmit an indication of a low battery state to the inventory management system; and
enter a power-saving mode.

19. A computer-implemented vehicle inventory management system for managing a vehicle inventory for a vehicle dealer that operates a dealer management system, the vehicle inventory management system operating in conjunction with a location device, comprising:
a processor;
a translation server module operating on the processor, wherein the translation server module is configured to translate a connection notice received from the location device from a first interface protocol into a second interface protocol; and
a memory configured to:
store the received connection notice; and
track information related to the location device; and
a location device management module operating on the processor, wherein the location device management module is configured to:
receive, over the network, a disconnect notice comprising a location device identifier;
identify, based on the received location device identifier, a vehicle in the vehicle inventory that the location device was most recently associated with;
retrieve ownership information associated with the identified vehicle from the dealer management system;
determine that the identified vehicle is owned by the vehicle dealer according to the received ownership information; and
associate the location device with a group of available location devices associated with the vehicle dealer in the memory.

20. The system of claim 19 wherein the stored connection notice includes a location device serial number.

21. The system of claim 19 adapted for a plurality of dealers, wherein the location device management module stores an association between the location device and one of the plurality of dealers.

22. The system of claim 19, wherein the location device management module is configured to:
receive, over the network, updated ownership information for the vehicle;
determine based on the updated ownership information that the vehicle has a new owner;
create a user account for the new owner in the memory;
associate the user account with the new owner in the memory;
associate the vehicle and the location device with the user account in the memory; and
disassociate the vehicle and the location device from the dealer in the memory.

23. The system of claim 19, wherein the location device is further configured to:
receive, over the network, by a user interface communicatively coupled to the inventory management system, a complete or partial vehicle identifier;
identify the vehicle associated with the complete or partial vehicle identifier in the memory;
retrieve the most recent location information of the vehicle from the memory; and
present the retrieved location information via the user interface.

24. A method for managing a vehicle inventory for a dealer implemented by a computer having a processor and a memory, the method comprising:
associating a location device identifier of a location device with a dealers group of location devices in the memory;
communicatively coupling the location with a vehicle;
receiving a connection notice transmitted over a network from the location device,
the connection notice including the location device identifier;
in response to receipt of the connection notice, associating the location device identifier with the vehicle in the memory;

receiving ownership information for the vehicle, the ownership information indicating that the vehicle has a new owner;
in response to receipt of the ownership information:
creating a user account in the memory;
associating the user account with the new owner in the memory;
associating the vehicle and the location device identifier with the user account in the memory; and
disassociating the location device identifier with the dealers group of location devices in the memory;
receiving a disconnect notice from the location device over the network;
determining, based on the location device identifier, the vehicle with which the location device was most recently associated;
querying a dealer management system associated with the vehicle for ownership information for the vehicle;
receiving the ownership information;
determining that the vehicle is owned by the dealer according to the ownership information; and
associating the location device with the dealer's group of available location devices in the memory.

25. The method of claim 24 further comprising the processor:
receiving a vehicle identifier over the network, wherein the vehicle identifier is entered through a user interface in communication with the network; and
associating the vehicle identifier with user account in the memory.

26. The method of claim 25 wherein the user interface comprises a mobile communication device.

27. A method for managing a vehicle inventory for a dealer implemented by a computer having a processor and a memory, the method comprising:
associating a location device identifier of a location device with a dealer's group of location devices in the memory;
communicatively coupling the location device with a vehicle;
receiving a connection notice transmitted over a network from the location device, the connection notice including the location device identifier;
in response to receipt of the connection notice, associating the location device identifier with a vehicle identifier in the memory, the vehicle identifier identifying the vehicle with which the location device is communicatively coupled;
receiving a vehicle status indicator transmitted from the location device, the vehicle status indicator indicating a characteristic of the vehicle; and
providing a status message regarding the characteristic on a user interface;
receiving a disconnect notice from the location device over the network: determining, based on the location device identifier, the vehicle with which the location device was most recently associated;
querying a dealer management system associated with the vehicle for ownership information for the vehicle;
receiving the ownership information;
determining that the vehicle is owned by the dealer according to the ownership information; and
associating the location device with the dealer's group of available location devices in the memory.

28. The method of claim 27, wherein the vehicle status indicator indicates a voltage level of a vehicle battery.

29. The method of claim 28 further comprising determining that the voltage level of the vehicle battery is below a predetermined threshold; and
configuring the location device to enter a power-saving mode.

30. An inventory management system comprising:
a location device comprising:
a processor; a GPS receiver;
an accelerometer for measuring acceleration information; and
a wireless communication device for transmitting the acceleration information via a wireless communication network;
a device translation server that receives the acceleration information and translates the acceleration information for a user interface; and
the inventory management system configured to:
receive a disconnect notice comprising a location device identifier;
identify, based on the received location device identifier, a vehicle in a vehicle dealer's vehicle inventory that the location device was most recently associated with;
retrieve ownership information associated with the identified vehicle;
determine that the identified vehicle is owned by the vehicle dealer according to the received ownership information; and
associate the location device with a group of available location devices associated with the vehicle dealer in the memory.

31. The inventory management system of claim 30 wherein the processor of the location device operates according to a script that can be programmed over-the-air via the wireless communication network.

32. The inventory management system of claim 30 wherein the location device is configured for installation in a vehicle, and the acceleration information is used for one or more of:
monitoring behavior of a driver of the vehicle;
determining an insurance rate; and
determining whether a vehicle impact has occurred.

* * * * *